(12) United States Patent
Oren et al.

(10) Patent No.: US 12,472,863 B2
(45) Date of Patent: Nov. 18, 2025

(54) LIGHTWEIGHT CHASSIS AND CONTAINER FOR TRANSPORTATION OF GOODS

(71) Applicant: KWIK International Group LLC, Pearland, TX (US)

(72) Inventors: John R. Oren, Houston, TX (US); Walter Cabrales, Houston, TX (US); Matthew Oren, Tomball, TX (US)

(73) Assignee: KWIK International Group LLC, Pearland, TX (US)

( * ) Notice: Subject to any disclaimer, the term of this patent is extended or adjusted under 35 U.S.C. 154(b) by 0 days.

(21) Appl. No.: 17/813,743

(22) Filed: Jul. 20, 2022

(65) Prior Publication Data
US 2023/0028672 A1   Jan. 26, 2023

Related U.S. Application Data

(60) Provisional application No. 63/368,068, filed on Jul. 11, 2022, provisional application No. 63/203,445, filed on Jul. 22, 2021, provisional application No. 63/203,382, filed on Jul. 20, 2021.

(51) Int. Cl.
*B60P 1/64* (2006.01)
*B60P 1/43* (2006.01)

(52) U.S. Cl.
CPC ............... *B60P 1/6409* (2013.01); *B60P 1/43* (2013.01); *B60P 1/6418* (2013.01)

(58) Field of Classification Search
CPC .......... B60P 1/6409; B60P 1/43; B60P 1/6418
See application file for complete search history.

(56) References Cited

U.S. PATENT DOCUMENTS

| 6,390,742 | B1* | 5/2002 | Breeden | B65D 90/0013 |
| | | | | 410/82 |
| 2006/0182580 | A1* | 8/2006 | Petersen | B60P 1/6454 |
| | | | | 414/538 |
| 2007/0182202 | A1 | 8/2007 | Brenneman et al. | |
| 2008/0219821 | A1* | 9/2008 | Marmur | B60P 1/6454 |
| | | | | 414/478 |
| 2010/0104408 | A1* | 4/2010 | Gaudet | B60G 11/27 |
| | | | | 414/495 |

(Continued)

FOREIGN PATENT DOCUMENTS

| EP | 1953037 A1 * | 8/2008 | ............. B60P 3/055 |
| GB | 967867 | 8/1964 | |

OTHER PUBLICATIONS

International Search Report and Written Opinion for PCT/US2022/073945, Nov. 4, 2022.

(Continued)

*Primary Examiner* — Saul Rodriguez
(74) *Attorney, Agent, or Firm* — Womble Bond Dickinson (US) LLP

(57) ABSTRACT

A system and methods for transportation/shipping and delivery of goods or commodities, including H3D goods/commodities. The system includes a lightweight chassis and a container or box, that can be transported by a drive vehicle such as a pickup truck or typical heavy duty pickup truck. The lightweight chassis may connect to a pickup truck or other drive vehicle by a hitch connection such as a gooseneck connection or trailer hitch.

30 Claims, 27 Drawing Sheets

(56) References Cited

U.S. PATENT DOCUMENTS

| | | | |
|---|---|---|---|
| 2015/0075271 A1* | 3/2015 | Tracy | G01M 17/027 |
| | | | 73/146 |
| 2016/0068090 A1* | 3/2016 | Kibler | B60P 1/30 |
| | | | 298/14 |
| 2018/0170449 A1* | 6/2018 | Cox | B62D 25/2054 |
| 2018/0178702 A1* | 6/2018 | Gardner | B60P 1/162 |
| 2018/0178704 A1* | 6/2018 | Sailer | B60P 1/6463 |
| 2021/0070339 A1 | 3/2021 | King | |

OTHER PUBLICATIONS

International Preliminary Report on Patentability for PCT/US2022/073945, mailed Feb. 1, 2024.

* cited by examiner

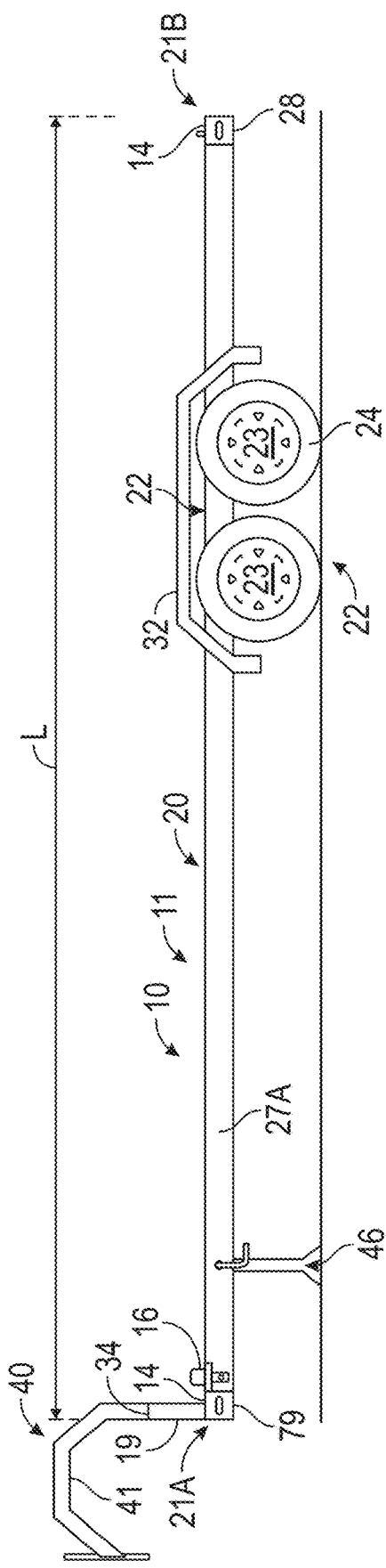
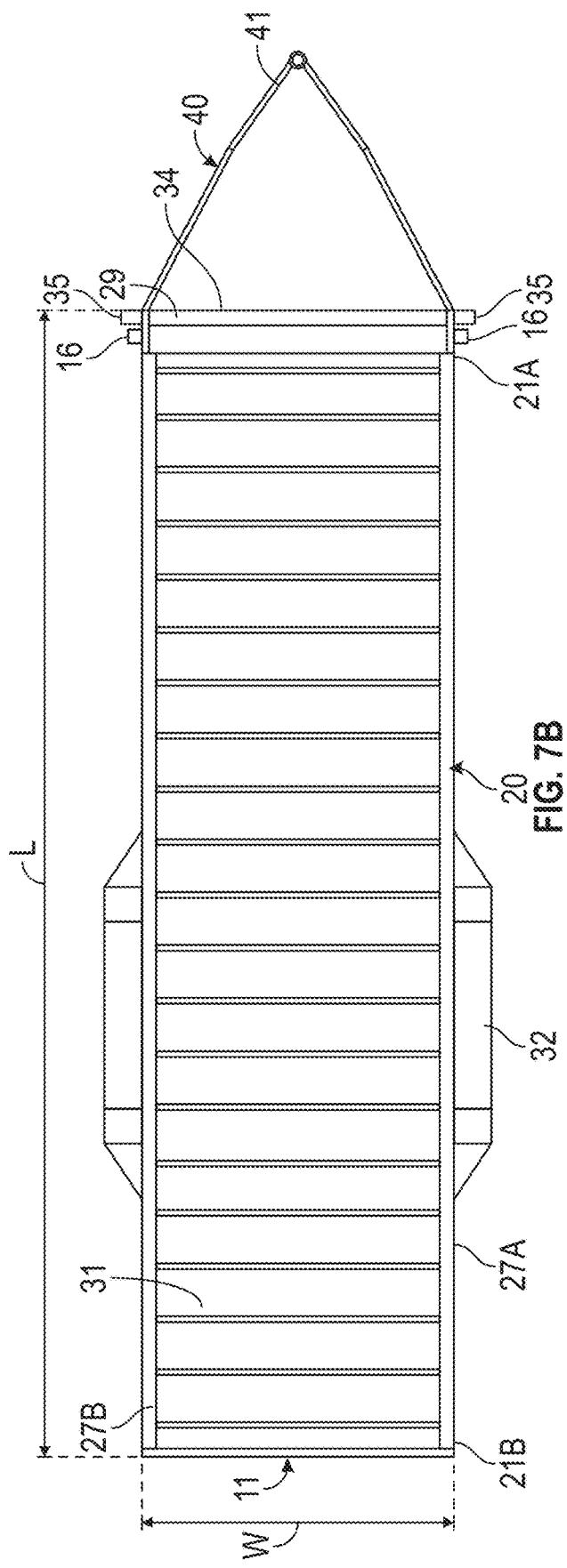

LIGHTWEIGHT CHASSIS AND CONTAINER FOR TRANSPORTATION OF GOODS

PRIORITY CLAIM

The present application claims priority to U.S. Provisional Application No. 63/203,382, titled LIGHTWEIGHT CHASSIS AND CONTAINER, filed Jul. 20, 2021; to U.S. Provisional Application No. 63/203,445, titled TRANSPORTATION SYSTEMS, LIGHTWEIGHT CHASSIS, LIGHTWEIGHT CONTAINER AND ASSOCIATED METHODS, filed Jul. 22, 2021; and to U.S. Provisional Application No. 63/368,068, titled LIGHTWEIGHT CHASSIS AND CONTAINER FOR TRANSPORTATION OF GOODS, filed Jul. 11, 2022.

CROSS REFERENCE TO RELATED APPLICATIONS

The disclosures of U.S. Provisional Application No. 63/203,382, titled LIGHTWEIGHT CHASSIS AND CONTAINER, filed Jul. 20, 2021; U.S. Provisional Application No. 63/203,445, titled TRANSPORTATION SYSTEMS, LIGHTWEIGHT CHASSIS, LIGHTWEIGHT CONTAINER AND ASSOCIATED METHODS, filed Jul. 22, 2021; and U.S. Provisional Application No. 63/368,068, titled LIGHTWEIGHT CHASSIS AND CONTAINER FOR TRANSPORTATION OF GOODS, filed Jul. 11, 2022, are specifically incorporated herein as if set forth in their entireties.

FIELD OF DISCLOSURE

Embodiments of this disclosure relate to a lightweight chassis and container and, more particularly, to lightweight chassis and container configured to be pulled by a pickup truck.

BACKGROUND

Ecommerce has completely disrupted the public's psyche in regards to how goods are purchased, and how people shop for goods. More recent global events have accelerated acceptance of purchasing goods online and allowing vendors to manage the delivery of the goods into the purchaser's home. Such a function is considered or understood to be "the final mile."

Large transportation or shipping companies like UPS, FedEx, Amazon and the United States Postal Service deliver the vast majority of goods bought online and delivered into homes. However; these companies are limited in what they can deliver to homes by dimension and weight. Such shipping companies' home delivery vehicles comprise a significant capital expenditure (e.g., due to the purchase of such vehicles, maintenance, labor costs, etc.), and generally are not designed to deliver heavier and harder to handle ("H3D") commodities or goods. Many shippers of H3D products were caught off guard by the recent acceleration of online purchasing and have been left with substantial gaps in their final mile capabilities at such H3D goods. To address such gaps, these shippers have turned to traditional truckload shipping, less than truckload shipping, and third-party logistics providers to solve their massive problem. Many of these transportation providers also have now turned to the same-day, express delivery industry to deliver H3D commodities the final mile (into the home, into the specific room, disassemble and assemble—so called "white glove" services).

Traditional same-day, express delivery providers generally will accept the H3D commodities into their warehouses and route them out for delivery into homes on traditional large trucks, typically, twenty-six foot, or longer straight trucks (bobtails) equipped with lift gates. Every square foot of such larger box trucks generally must be utilized to maximize revenue and to pay for the costs associated with the operation of the truck, warehouse operation, administrative function, and other costs associated with operating this sort of business. In particular, the trucks that are typically used for these final mile services are heavy and expensive to operate—especially given ever rising fuel costs and when the weight of the cargo being transported is such that the capacity of the large truck is not fully utilized, which can limit the amount of revenue generated by such deliveries versus the expense of operating a truck of this size.

Accordingly, Applicants have recognized a need for an improved system and methods for transporting goods/commodities, and, more particularly, to a system and method of transporting goods/commodities utilizing a lightweight chassis and transport containers or boxes configured to connect to and be transported by a lighter, smaller drive vehicle such as a pickup truck or a heavy duty pickup truck, rather than the typical larger twenty-six-foot straight truck. The present disclosure is directed to embodiments of such systems and methods.

SUMMARY OF THE INVENTION

Briefly described, the present disclosure relates to an improved system and methods for transportation/shipping and delivery of goods/commodities, including H3D goods/commodities. In embodiments, the system includes a lightweight chassis and a container or box, that can be transported by a drive vehicle such as a pickup truck or typical heavy duty pickup truck rather than requiring a larger, conventional box truck. It will be understood that, in embodiments of the system, the total length of the lightweight chassis with a container or box can be about 24-30 feet in length, with the transport container supported thereon, in some embodiments, being about 24-26 feet long, 8-10 feet high and about 8-10 feet wide. In addition, the lightweight chassis may connect to a pickup truck or other drive vehicle in a number of ways, such as via a gooseneck connection or trailer hitch. Other connections may be utilized, such as a rear receiver hitch, $5^{th}$ wheel hitch, pintle hitch, bumper hitch, or weight distribution hitch.

According to one or more embodiments of the disclosure, the container will include a frame, lengthwise extending side walls, a floor and a roof. The container will have an end door panel that can be pivoted from a raised, locked position to a lower, loading position, forming a ramp. The container also may be designed so that a rearward section extends along a selected distance or length from an intermediate point along the floor, terminating at a rear end of the container, the rearward section further oriented and extending at an angle downwardly for a selected drop distance, e.g. extending the last four feet of the bottom of the container with a drop of about six inches at the rear end thereof. The purpose of such a drop is to significantly reduce or eliminate the apex of an angle between the end of the transport container and a surface of the ground when the back panel is lowered and used as a ramp, resulting in a substantially consistent, straight lower slope loading platform.

Two or more lightweight containers also can be stacked one container on top of another, according to one or more embodiments of the disclosure, using stacking cones at the four corners of the container in order to stack one container on top of another, thus conserving storage space. Further, each container may be separate from the lightweight chassis. In other words, the containers may be completely removed from the chassis. Each container may further include forklift slots. As such, containers may be loaded then lifted onto a chassis. In another embodiment, the container may be loaded while on the chassis. In another embodiment, the container may be fixedly attached to the chassis.

Each container can be provided with one or more side door panels, according to one or more embodiments of the disclosure. Further, in some embodiments, the container can have an end/rear opening or end door panel at the rear of the container, as well as multiple side door panels or other drop-down panels located at varying or opposing locations along the opposite sides of the container, thus providing additional loading openings and access to the container from both sides thereof. Each container, additionally may include an electrical outlet.

According to one or more embodiments of the disclosure, the chassis can be formed as a trailer with a body or frame having a length of about 20-24-feet (in some embodiments about 21-22 feet), with a dual dolly to lift the front of the chassis with or without a container attached to the chassis. The chassis may utilize container chassis corner castings with twist locks. In another embodiment, rotating corner castings may be employed or utilized if and when the container is lifted from the front or first end of the chassis, such as by utilizing lifting jacks coupled to the front end of the chassis for example, and not limitation, the lifting jacks can include electric/hydraulic bottle jacks with at least an eighteen-inch travel distance and an eight-ton lifting capacity. In an embodiment, the chassis may include hitch connections for connecting the chassis to a pickup truck (e.g., gooseneck, $5^{th}$ wheel, and so on). Bolsters also can be provided at corners of the chassis frame, and can be moved away from the frame to help support the container.

According to one or more embodiments of the disclosure, the container and the chassis may be lifted by, at least, twelve inches with the lifting jacks and supported by the dual dollies. As noted, the container may include about a six inch drop at the last four foot of the container. The last four feet of the container also may overhang the back end of the chassis (e.g., the container can be about 26 feet long, while the chassis can be about 22 feet long). When the chassis is lifted by about twelve inches at the front of the chassis, and with the rearward section (e.g. the last four feet) of the container dropping about six inches, the rear end of the container is manipulated lower, resulting in an approximately two-foot drop from the floor of the container to the ground surface.

When the end door panel is lowered (and used as a ramp), the apex of the angle between the container floor and the surface of the ground is reduced significantly or virtually eliminated, providing a substantially straight, low slope loading surface, thus allowing a delivery driver to use a low profile pallet jack. A low profile pallet jack is an inexpensive tool used to pick up pallets and move them from one place to another safely. Due to the low profile of the low profile pallet jack, a greater apex of the angle between the surface of the ground and the floor of the container will make the pallet jack hit high center and eliminate the use of such a tool for delivery of H3D cargo, palletized cargo, etc.

In an embodiment, the side and end door panels and any of the floor, roof and/or walls of the container may be comprised of a series of lightweight, high strength panels mounted along frame members or beams of the container frame. The panels can include panels or sheets formed from a composite material, e.g., a metal sandwich material comprising two or more composite materials laminated or glued together, a composite material glued to metal, or some combination thereof. Such composite, metal sandwich material panels may be lighter in weight than similar sandwich steel panels, yet strong enough to allow users to carry heavy loads thereover without substantially bending or deflecting. Other materials may comprise a sandwich comprising a core sheet (e.g., made of metal) connected via adhesive to two outer facing composite sheets. The core sheet may comprise different mechanical properties (e.g. compressive and/or tensile strength, bending, stiffness, etc. . . . ) along a first direction versus a second direction.

A method for utilizing such a lightweight chassis and container for transporting goods/commodities may include actuating the lifting jacks and/or dual dollies. Such actuation may lift the front end of the chassis and container about 12 inches. When the chassis is flat or the dollies are not in an actuated or lowered position, the front end or forward section of the container may be about 24 inches from the ground, while the rear end or rearward section may be about 18 inches from the ground. As the front of the container is lifted 12 inches upwards, the rear of the container may be lowered about 12 inches, such that the floor of the container has a slope or angle of about 20°-25°. Thus, about a 6-inch clearance is left at the rear of the container. In other words, the bottom most portion of the container may be about 15-18 inches from the ground. Once the dual dollies are actuated, the end door panel may be lowered. Thus, the end door panel may form a ramp. As the end door panel is lowered, the apex of the angle between the distal end of the container and the surface of the ground may be substantially eliminated, with the free end of the door panel opposite the hingedly attached portion touching or coming in contact with the surface of the ground when lowered.

Goods/commodities, such as various size, shape and weight packages, including H3D commodities, can be loaded into or unloaded from the container. In embodiments, the floor of the container can incorporate a loading as part of a loading system and method a loading guide in the form of a grid or markings that can be used to selectively arrange packages by size and/or shape and to locate packages in positions relative to the side and end door panels of the container to enable easier and more efficient loading/unloading of the container without having to follow a specific first in last out type method.

Once a package is loaded or unloaded from the container, the method may include lifting the door back into an upright position. Such an action may create a seal against the walls of the container. In an embodiment, when the container includes a ceiling or roof, each side/end door panel may form a substantially water resistant seal, e.g. may include a water tight sealing material such as a weather stripping or gasket. In an embodiment, the door panels may be physically moved by a user or by an actuator. In another embodiment, the door may include a lock mechanism.

The foregoing and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

BRIEF DESCRIPTION OF DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIG. 7A is a schematic side view of a lightweight chassis, according to embodiments of the disclosure.

FIGS. 7B-7D are a schematic top-down views of the lightweight chassis, according to embodiments of the disclosure.

DETAILED DESCRIPTION

Figure 1A:
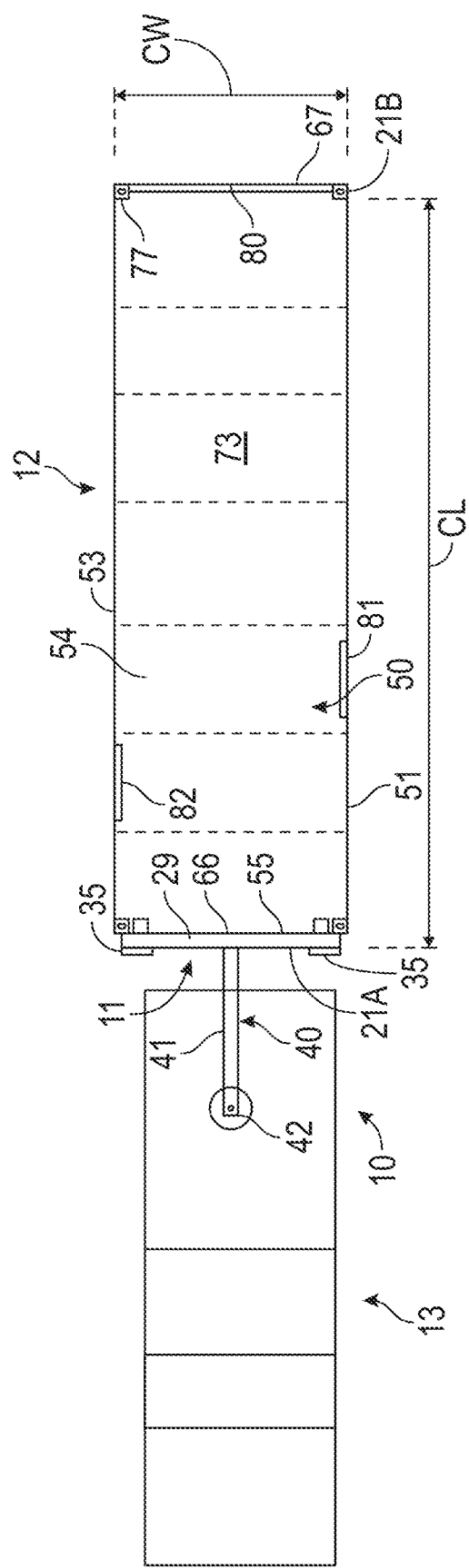
FIG. 1A is a schematic top-down perspective of a drive vehicle in comparison to a lightweight chassis and a container or box, according to embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to a system 10 and method for transport of goods/commodities of larger sizes and/or weights than typical ecommerce packages, e.g. heavier and harder-to-handle (H3D) type goods and other goods. In embodiments as described herein with reference to FIGS. 1A-8B, the system 10 can include an enhanced lightweight chassis and container or box 12 that can by pulled by a drive or transport vehicle 13, such as a pickup truck, heavy-duty pickup truck, or other consumer type vehicle capable of towing up to about 26,000 pounds (including the weight of the vehicle), thus substantially reducing or eliminating much of the high cost associated with operating large, heavy, and regulated delivery trucks.

For example such large, heavy, and regulated delivery trucks are generally driven by people required to have a commercial driver's license (CDL), while the driver of a pickup truck or heavy duty pickup truck does not require a CDL. Typically, most final mile delivery services often contract with individual drivers or services that own their own twenty-six-foot straight truck(s) and contract with final mile delivery companies as independent contractors. There is a limited pool of such CDL licensed independent contractors, and they are increasingly commanding higher commission fees to do this work, which can significantly erode margins for the final mile delivery company. It is also difficult to recruit train and retain independent contractors to do this work skillfully, consistently, and with a high quality end product. Therefore, the lightweight chassis and container or box of the system and method of this disclosure can significantly broaden and deepen the pool of independent contractors able to perform this type of delivery work, by enabling users to utilize non-commercial vehicles such as pickup trucks providing a significant cost savings and enable improvement over current labor conditions.

As indicated in a FIGS. 1B, 1C, 2 and 8A-8B, the lightweight chassis 11 and container or box 12 of the system 10 is designed to be much lower to the ground, and to enable substantial reduction or elimination of the apex of an angle between the floor of the container at the rear end of the container and a surface of the ground during loading and unloading, thus improving safety when loading and unloading cargo from the container. The lightweight chassis and container or box further generally is designed with a reduced weight, for example, in embodiments, being configured to not exceed about 26,000 pounds in combination with the weight of the drive vehicle, such as a pickup truck, and the cargo being delivered. The lightweight chassis and container or box also is configured or designed so that a heavy lift gate can be eliminated which can help reduce weight of the lightweight chassis and container, which further can allow for more cargo to be loaded and transported.

Figure 1B:
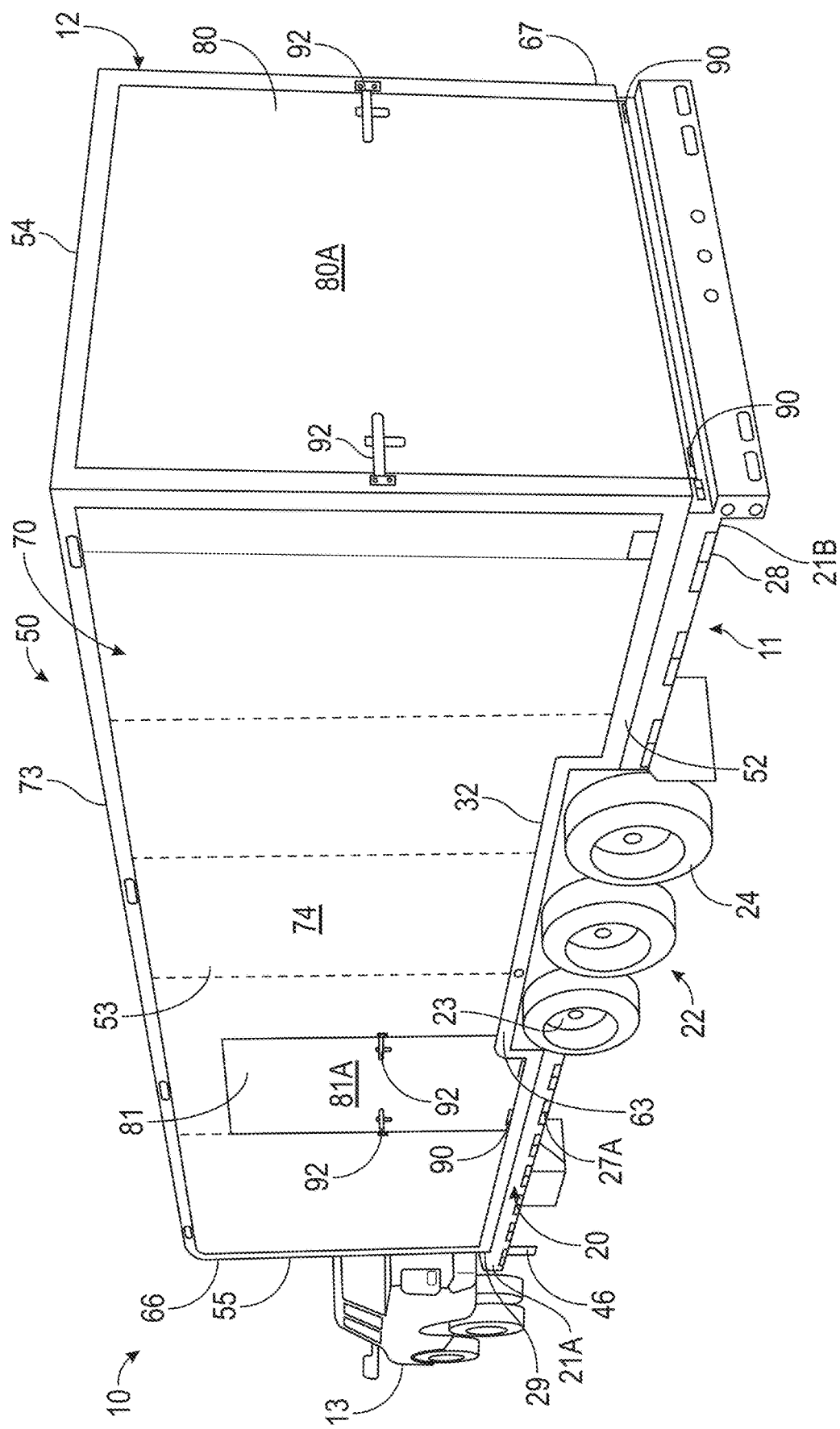
FIG. 1B is an end perspective view of a lightweight chassis and a container or box coupled to a pickup truck according to embodiments of the disclosure.
Figure 1C:
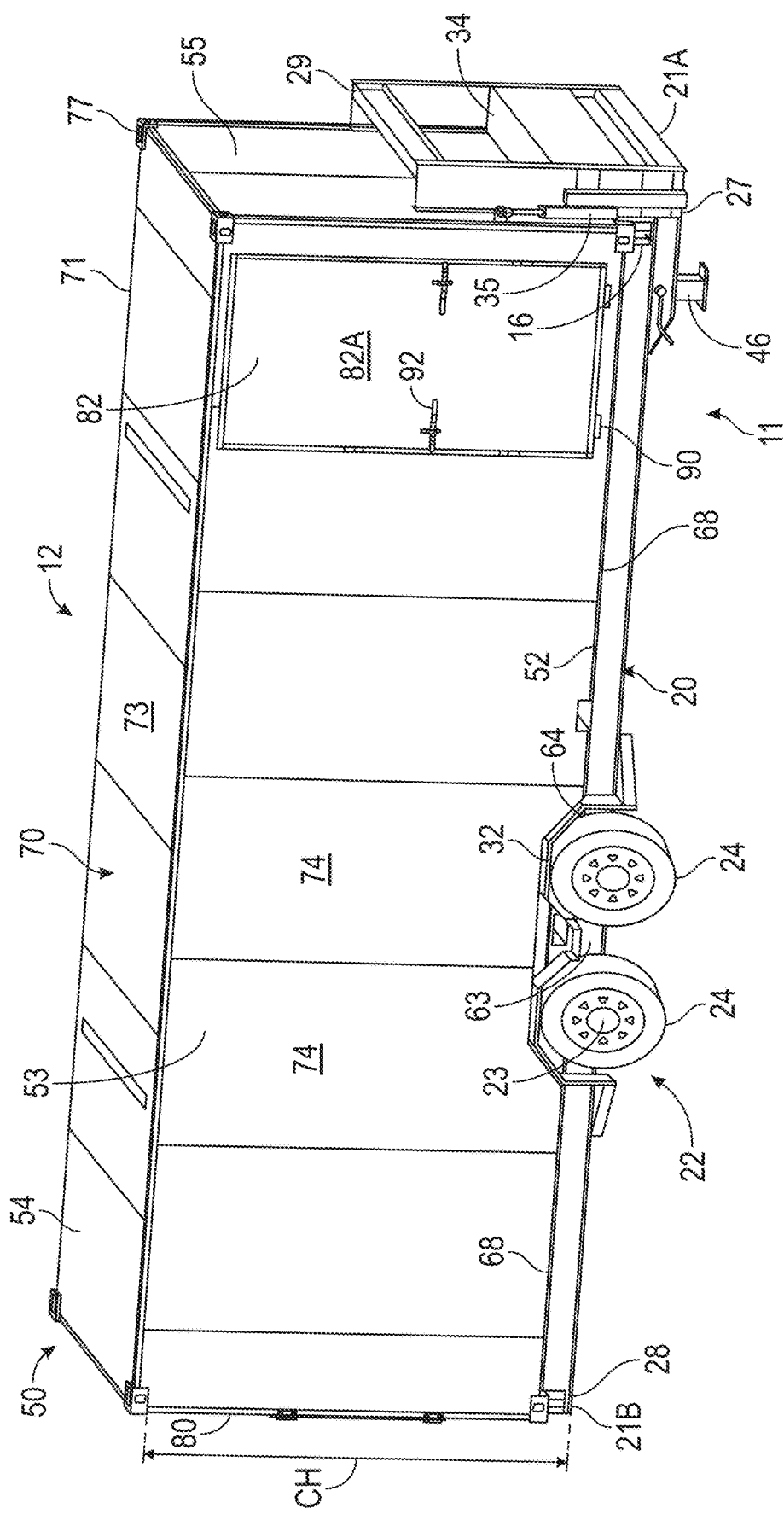
FIG. 1C is a side perspective view of a lightweight chassis and a container or box coupled to a pickup truck according to embodiments of the disclosure.
Figure 1D:
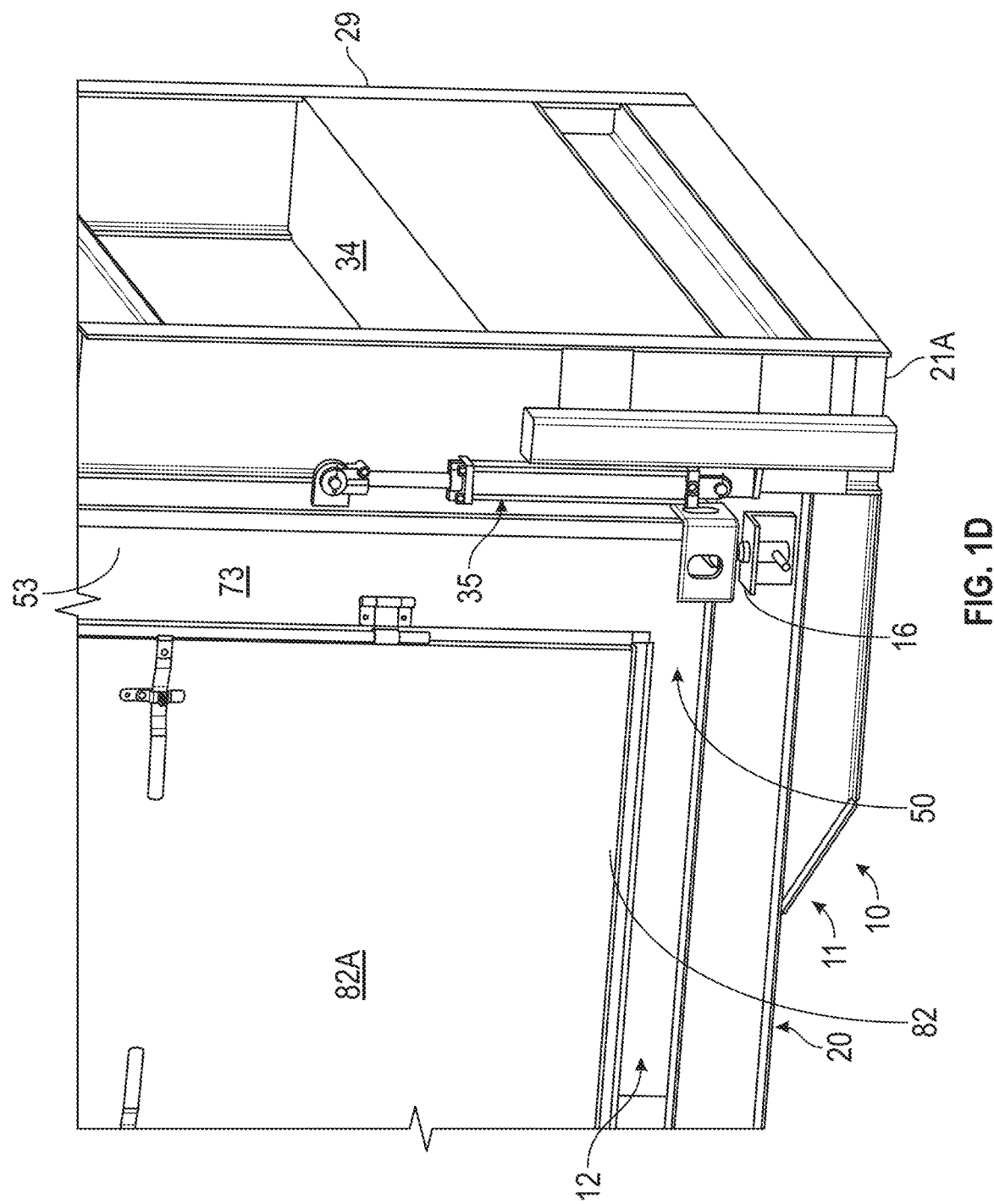
FIG. 1D is a close-up view of the first end of the lightweight chassis and a container or box illustrating a lifting jack and bolster according to embodiments of the disclosure.
Figure 5A:
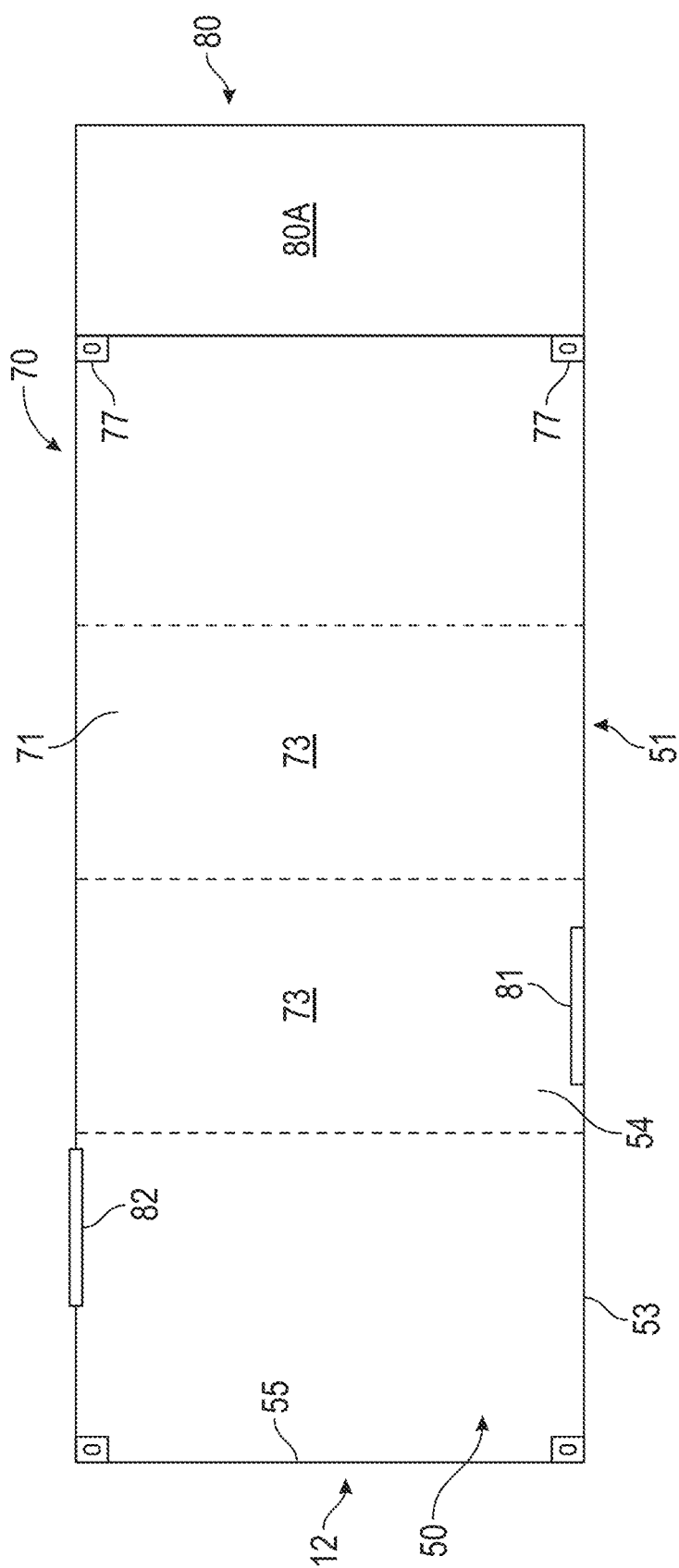
FIG. 5A is a perspective end view of a lightweight chassis and container or box according to embodiments of the disclosure.
Figure 5B:
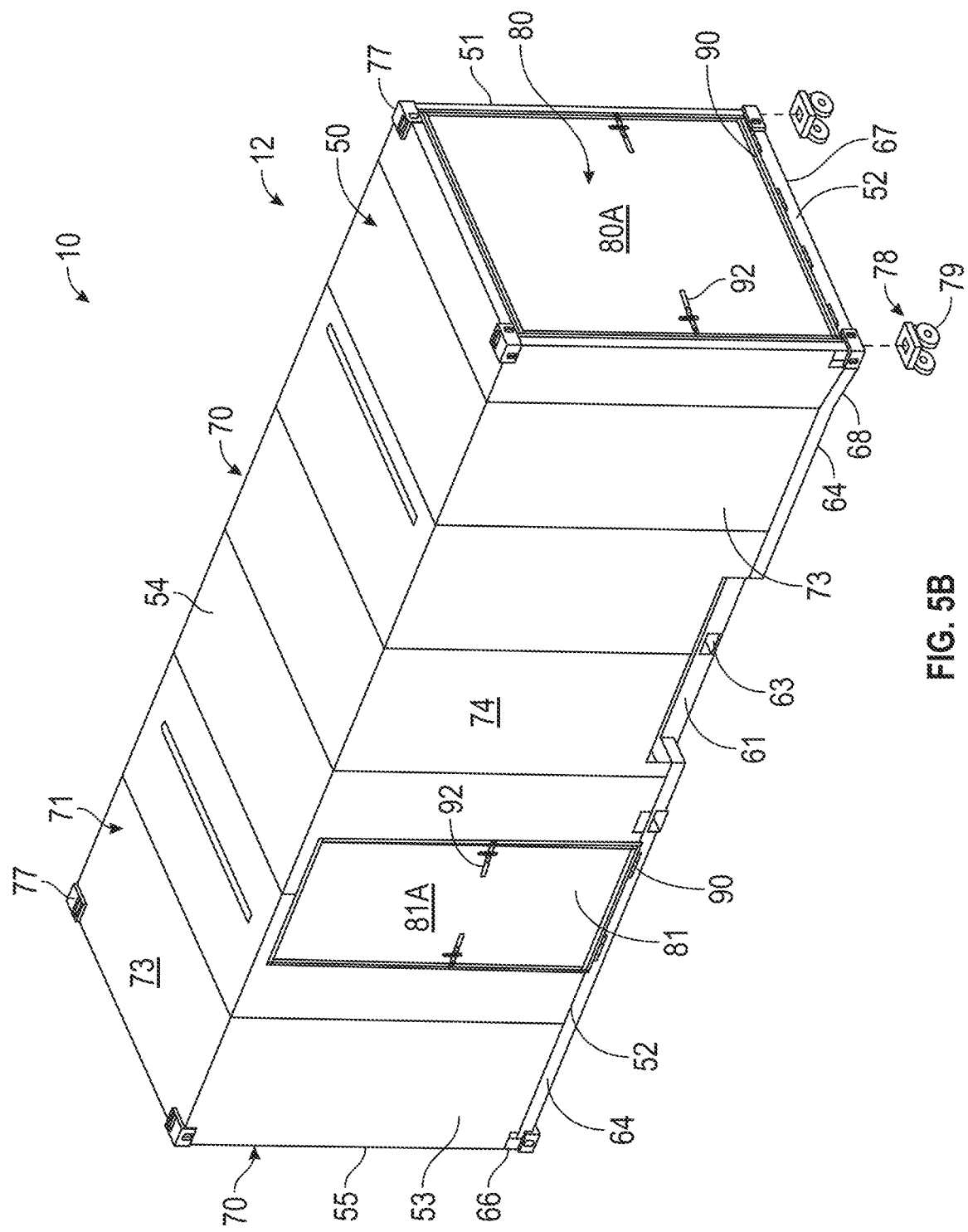
FIG. 5B is a perspective view of a lightweight chassis and container or box with side and end door panels, and an end door panel, according to embodiments of the disclosure.
Figure 5C:
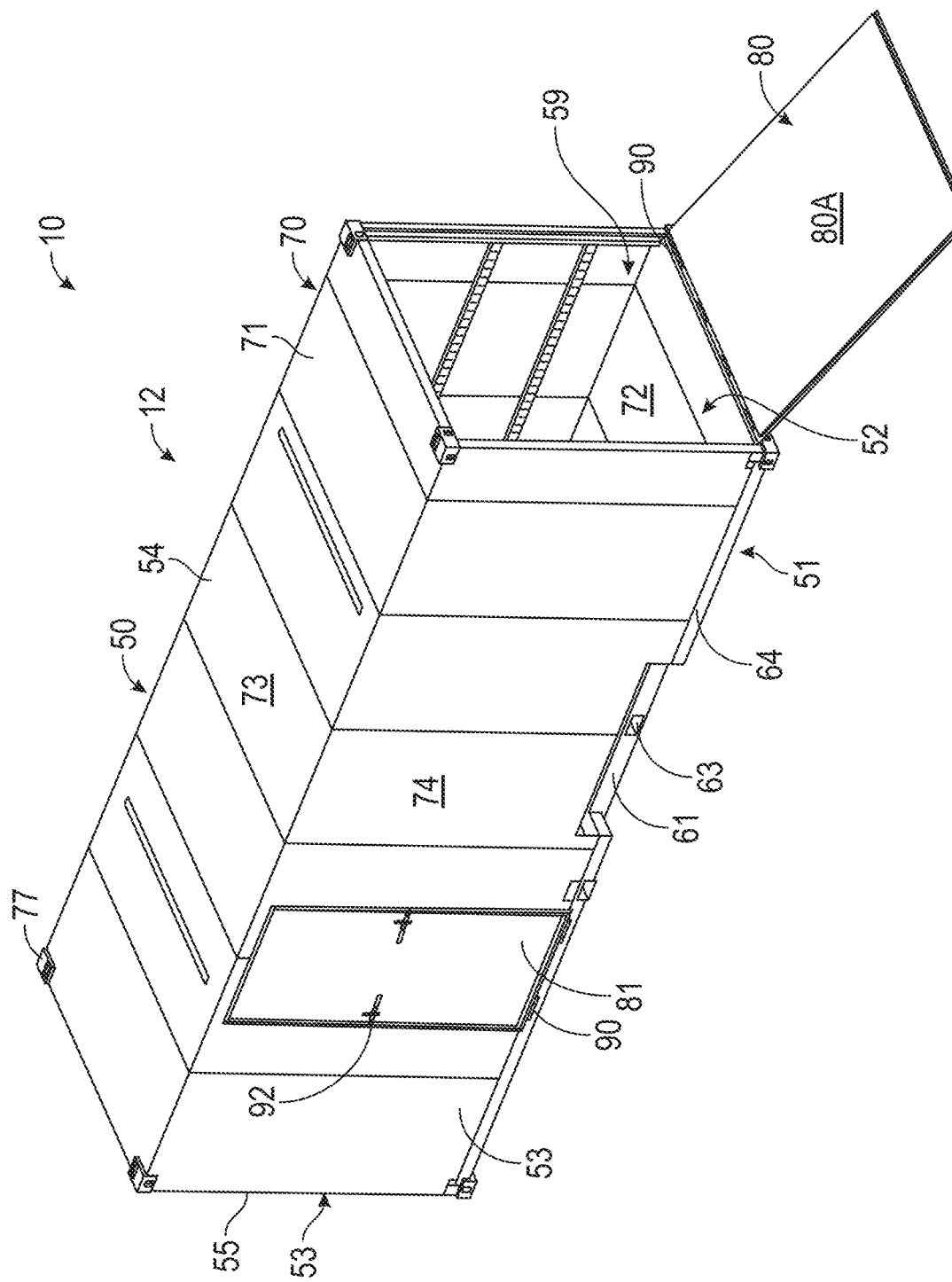
FIG. 5C is a perspective view of a lightweight chassis and container or box with open side and end door panels shown in a lowered, an open position according to embodiments of the disclosure.
Figure 5D:
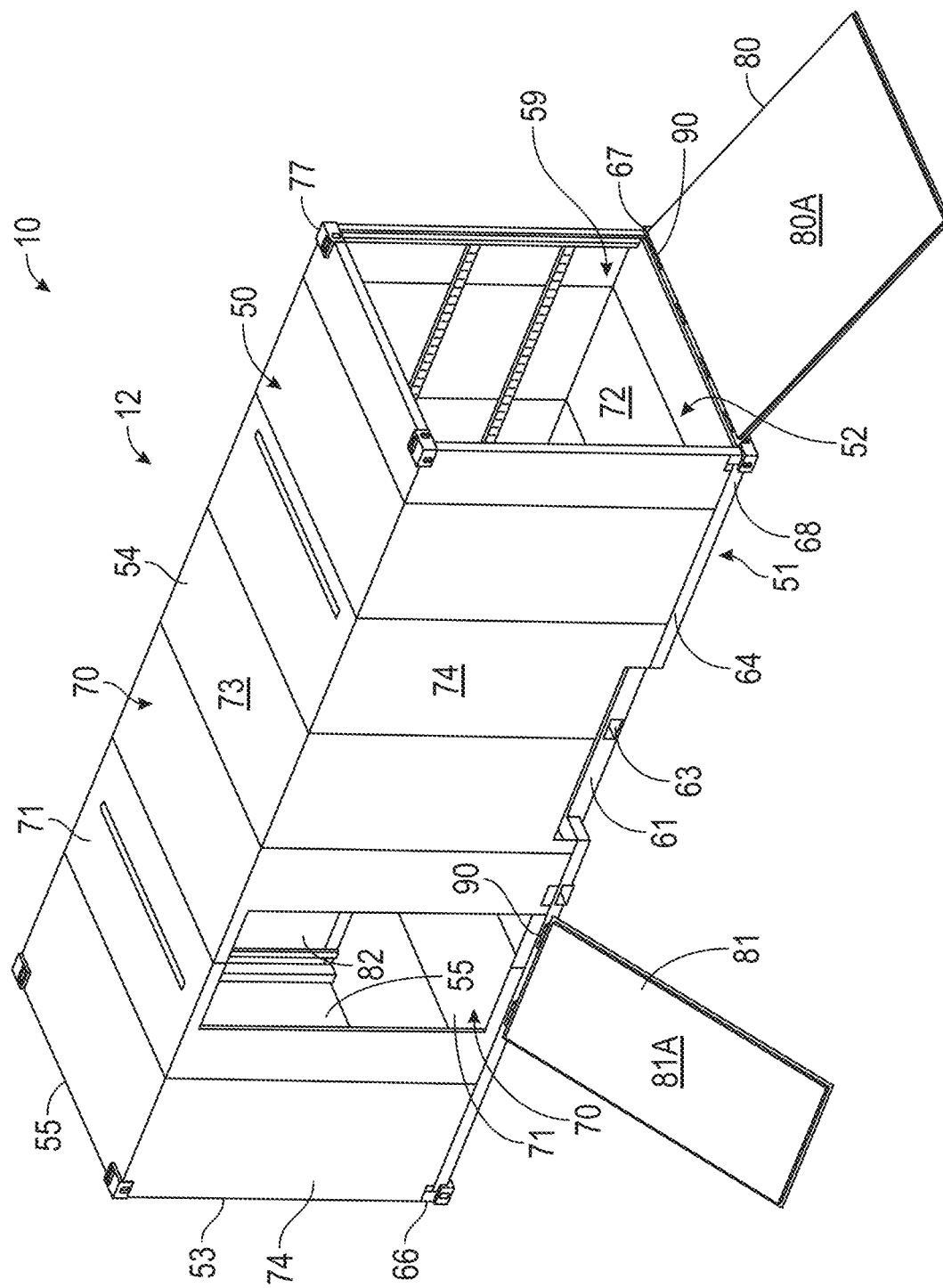
FIGS. 5D-5E are end perspective views of a lightweight chassis and container or box with a side door panel and an end panel, both shown in a lowered, an open position according to embodiments of the disclosure.
Figure 5E:
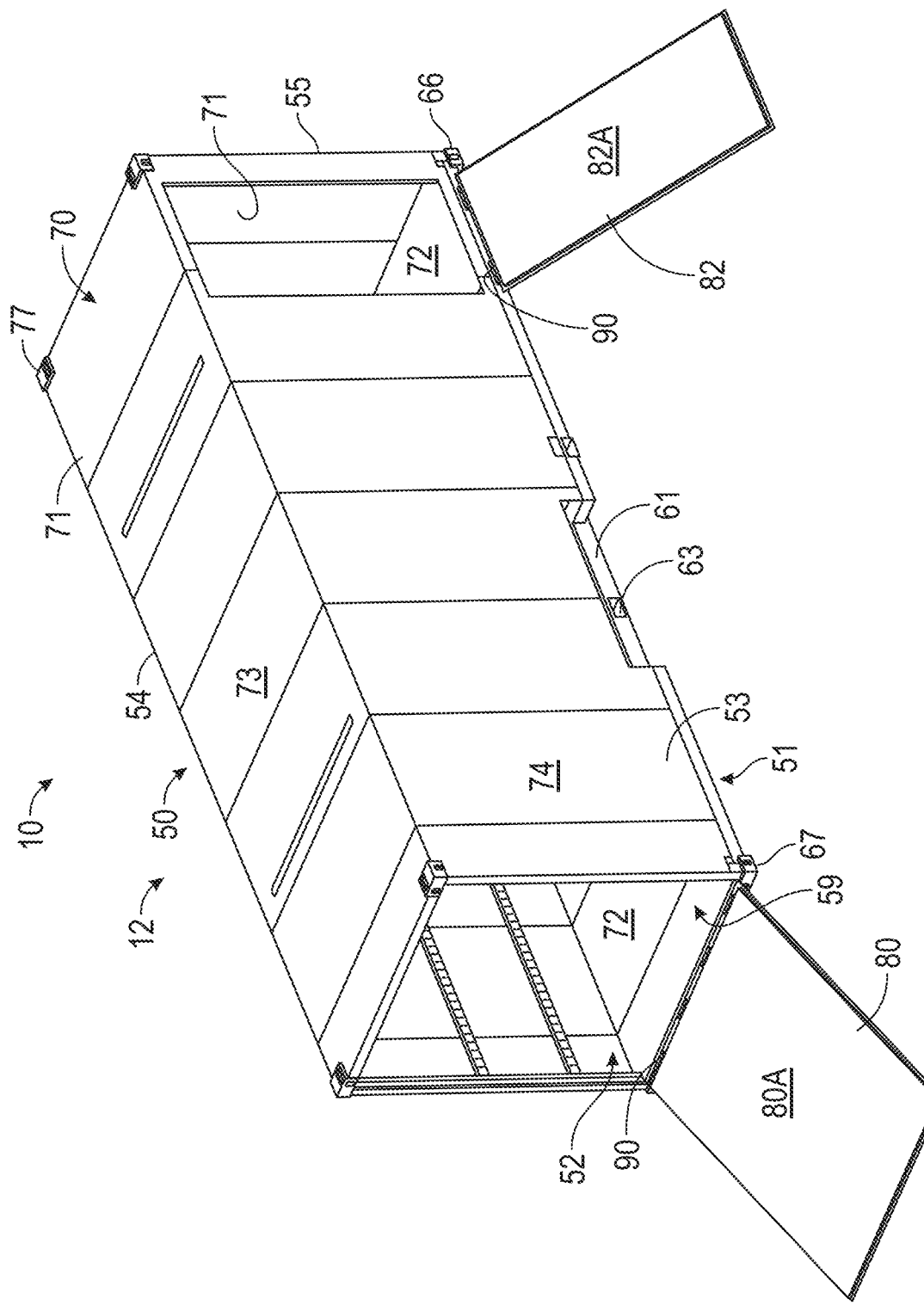
Figure 6A:
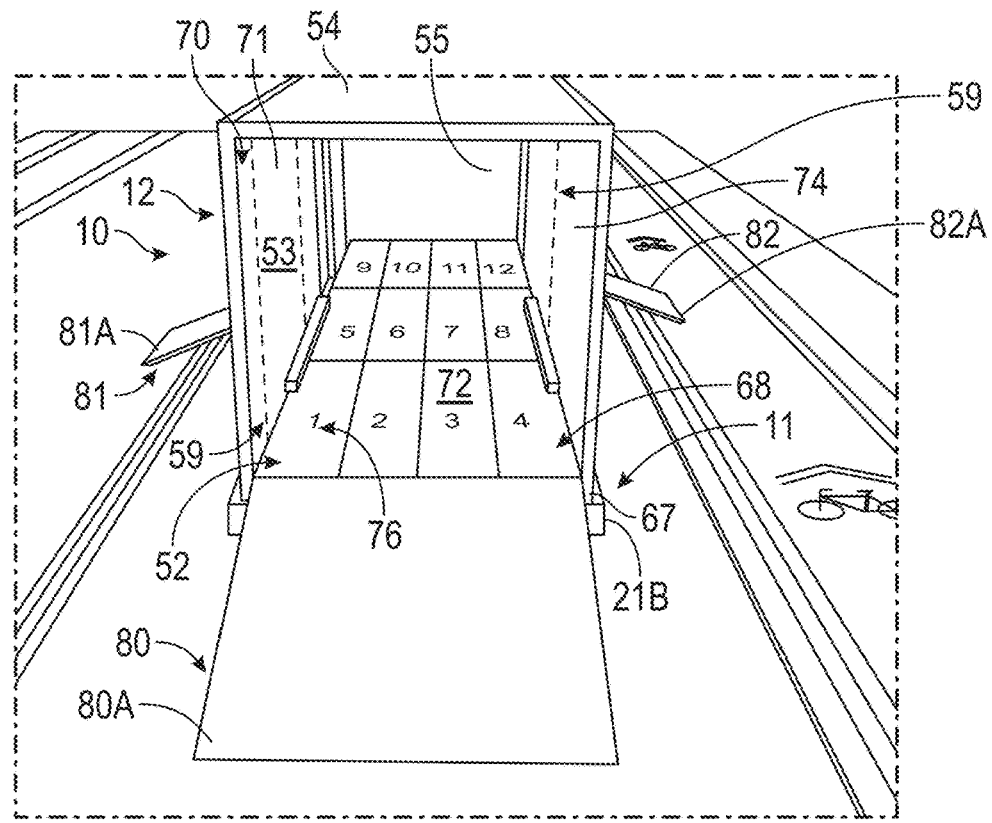
FIGS. 6A and 6B are end perspective view schematically illustrating the lightweight container or box having with an example loading guide, according to embodiments of the disclosure.
Figure 6B:
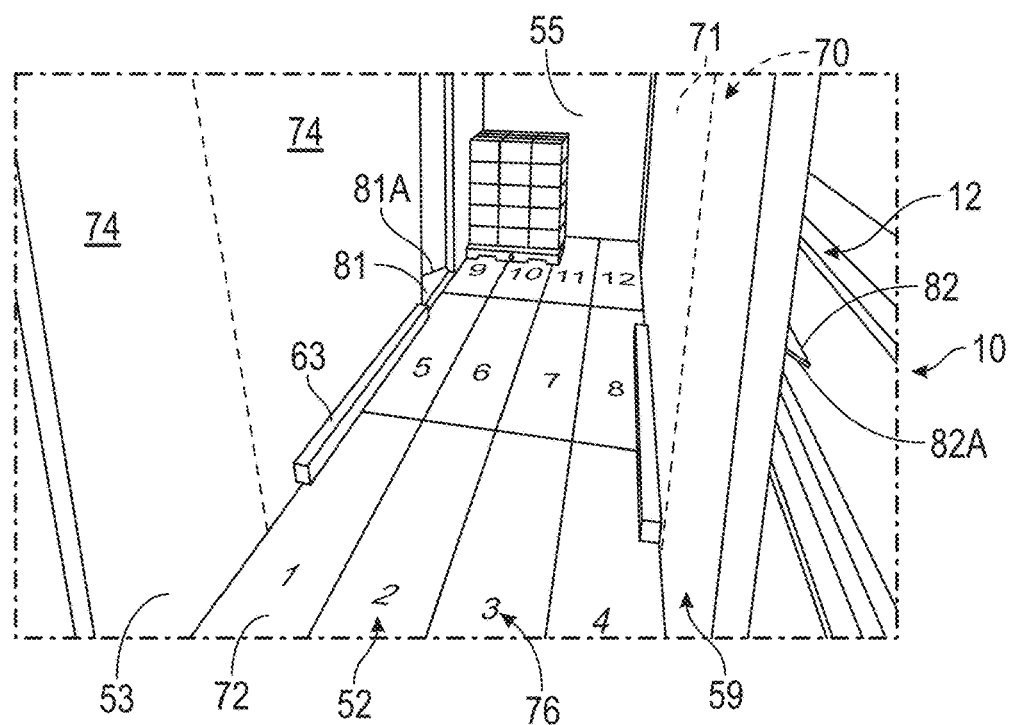

In embodiments, such as shown in FIGS. 6A-6B, the container or box 12 further can be configured to provide for a guided method of loading that maximizes available space within the container or box, as well as improve efficiencies in delivery and unloading of various size, weight and/or configuration goods over more conventional "first in-first out" methods. The lightweight chassis and container or box also is designed so that the chassis, via, for example, a dual dolly or jack, is able to raise the front of the container or box by almost 12 inches or more for loading and unloading, which, together with a selected drop distance DD (FIG. 8B) provided at between the rear end of the container or box in relation to the second end of the chassis, will significantly reduce or virtually eliminate the apex of the angle between the ground and the container or box, e.g. in embodiments, a rearward section 68 of the container or box can overlap the second end of the chassis by about 3-4 feet and can have a drop distance DD of about 5-6 inches. By substantially eliminating the apex of the angle between the ground surface and the floor of the container at the rear end of the container or box, substantially equal angles A1/A2 will be provided between the ramp and the ground and the ramp and floor of the container or box when the end door panel is lowered and used as a ramp to unload cargo, as indicated in FIGS. 8A-8B, enabling smooth loading and unloading of cargo. In embodiments, the cargo can be unloaded with two-wheel dollies, pallet jacks, or by personal lifting of cargo, FIGS. 1A-8B illustrate various embodiments of a system 10 for the transport of goods/commodities such as H3D goods or commodities in accordance with the principles of the present disclosure. As shown in FIGS. 1A-1C and 2, in embodiments, the system 10 includes a lightweight chassis 11 and container or box 12 that can be coupled to and driven by a drive vehicle 13. In embodiments such as illustrated in FIGS. 1A-1C, the drive vehicle 13 can include a conventional pick-up truck; for example, a one ton or larger pick-up truck such as a Dodge Ram 3500, a Ford F-350, a Chevy Silverado 3500, or other heavy-duty pick-up truck or other, similar types of drive vehicles.

Figure 2:
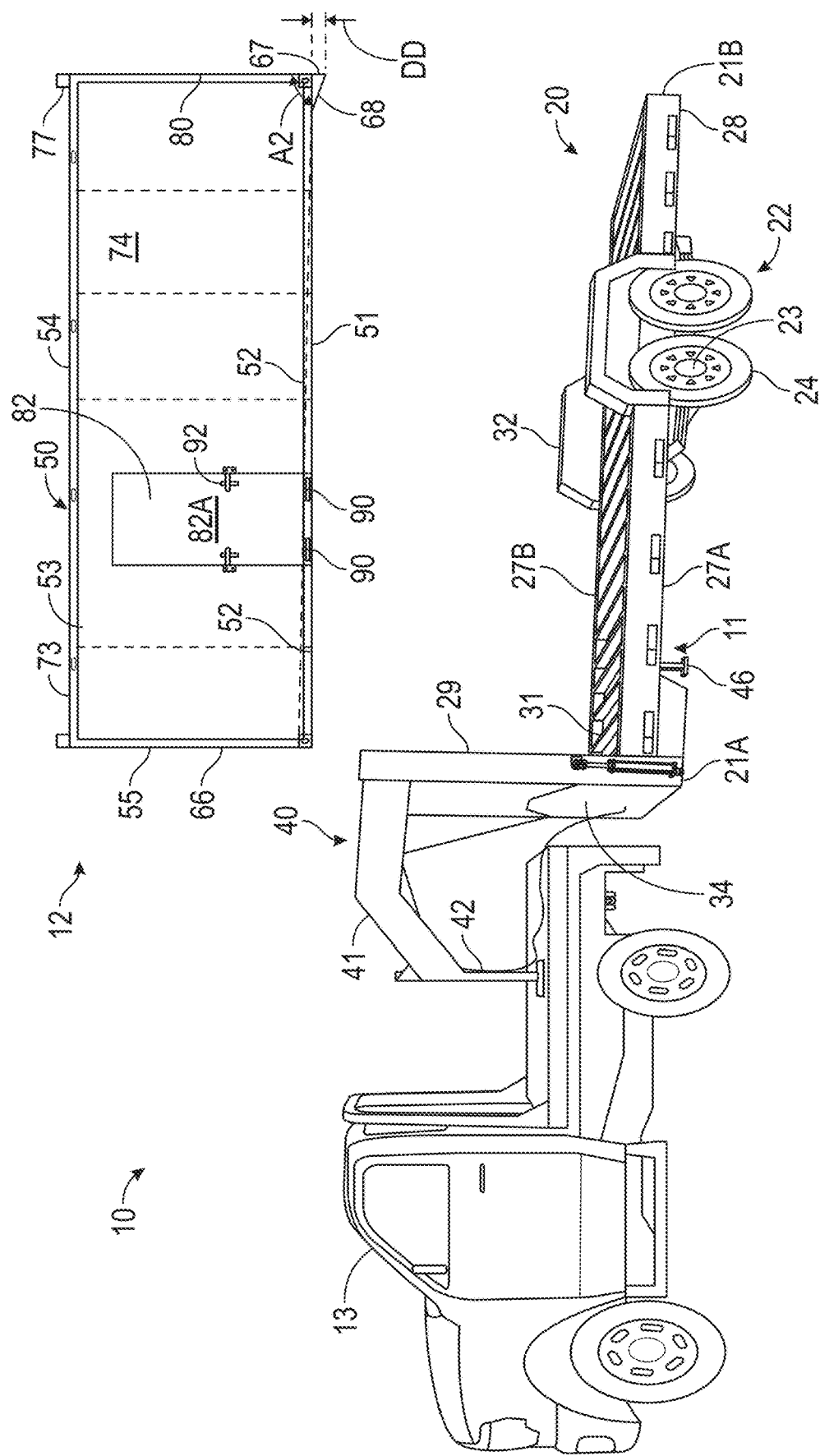
FIG. 2 is a schematic side-view of a pickup truck in comparison to the lightweight chassis and a container or box, according to embodiments of the disclosure.

FIGS. 1A, 1B and 2 show various views illustrating a pick-up truck in comparison to the lightweight chassis and container or box 12 according to one or more example embodiments of the present disclosure. These figures generally depict a scale of the lightweight chassis and container or box driven by or in combination with a typical heavy-duty conventional pick-up truck. It may be understood from the figures that the total length of the pick-up truck and lightweight chassis and container or box can vary depending on the size or configuration of the containers or boxes received on and transported by the lightweight chassis.

For example, in some embodiments, as illustrated in FIGS. 1A-2 and 7A-7D, the lightweight chassis 11 generally can be formed with a first or chassis length L that can range from approximately 20-26 feet in length; and in embodiments, having a length L of approximately 22 feet. In embodiments, the lightweight chassis can have a height or ground clearance GC of about 24 inches; and a width W that can range in embodiments between about 8 to $8^{1/2}$ feet across the width of the lightweight chassis.

In embodiments, in addition, the container or box can have a second or container length CL greater than the length L of the chassis, e.g. of approximately 24-28 feet, a height CH of approximately 8-10 feet, and a width CW of approximately 8-10 feet; and in some embodiments, maybe approximately 26 feet long, approximately 9 feet high, and approximately 8 feet wide. The size, dimensions and or configuration of the containers or boxes that can be stacked on or mounted to and carried by the lightweight chassis can be varied, as will be understood by those skilled in the art, depending upon the transport/shipping operation being carried out.

The lightweight chassis further can include corner castings 14 (FIGS. 1D, 1D and 7A) that can be mounted at the corners of the lightweight chassis to help secure the containers or boxes on the chassis. The chassis also can include bolsters 16 (FIG. 1E) that can be provided at the corners of the chassis at the first and second ends thereof. The bolsters can project from the sides of the chassis to provide additional supports for a container or box 12 received on the chassis as needed, such as during transport and/or during loading and unloading operations.

The structure of the lightweight chassis and container or box, as illustrated in the present embodiments, is configured to provide a cargo capacity that can be approximately equivalent to larger straight box trucks (e.g. 26 foot box trucks as more conventionally used, while providing increased flexibility in such transport operations by enabling use of more fuel efficient, easier and cheaper to maintain conventional consumer type vehicles such as a conventional heavy-duty pick-up truck, versus such larger box trucks, and a larger pool of potential drivers without requiring a CDL License.

Figure 7C:
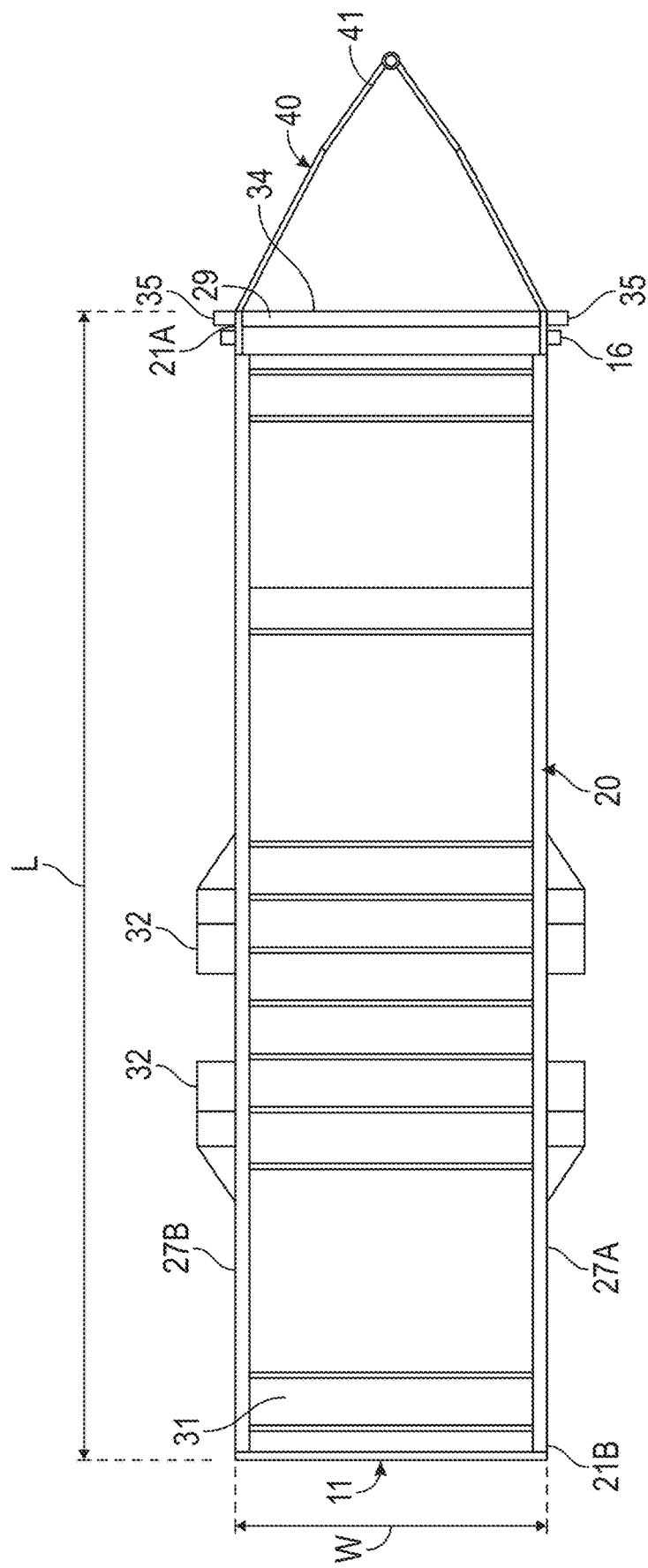
Figure 7D:
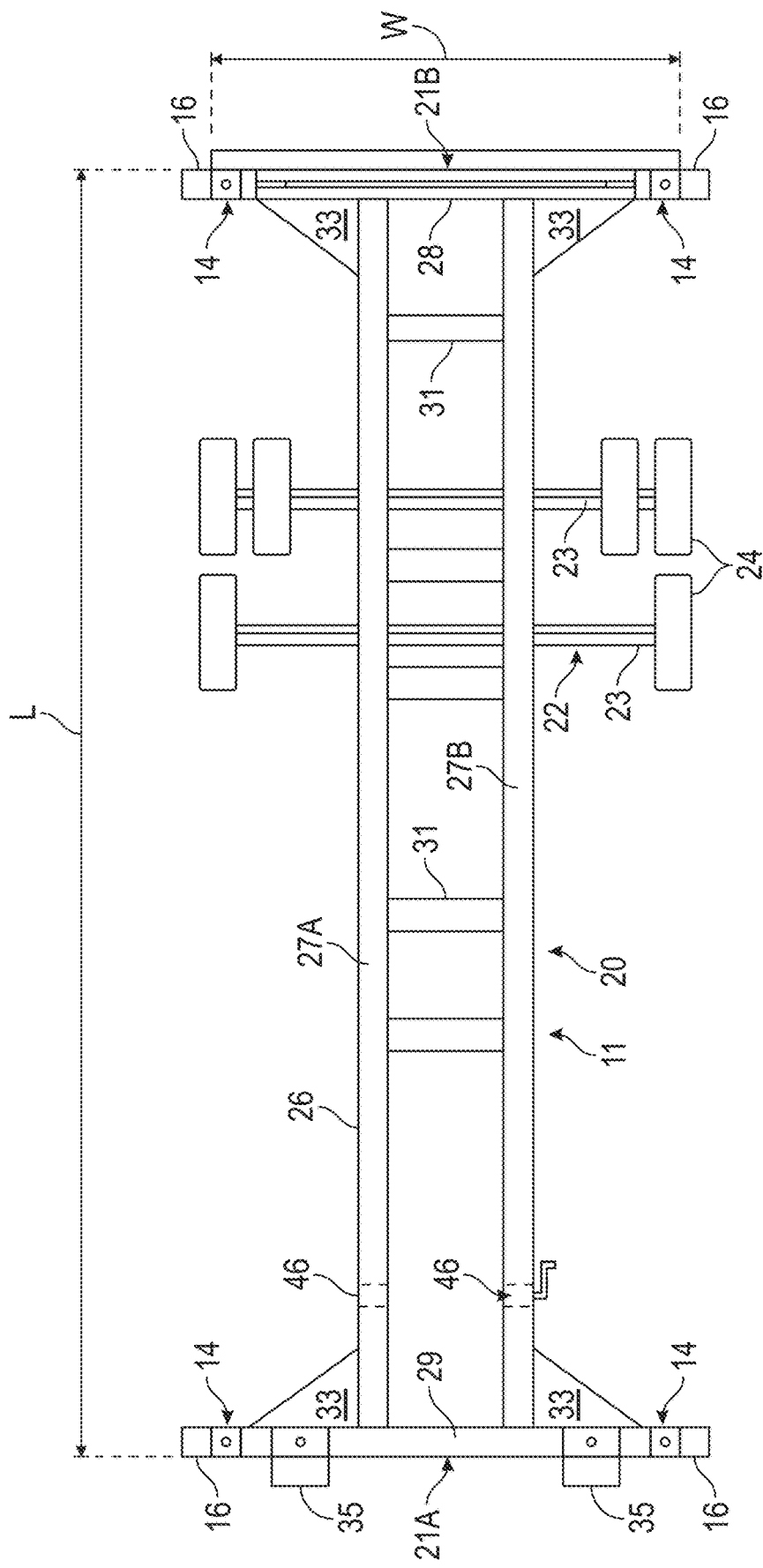
Figure 8A:
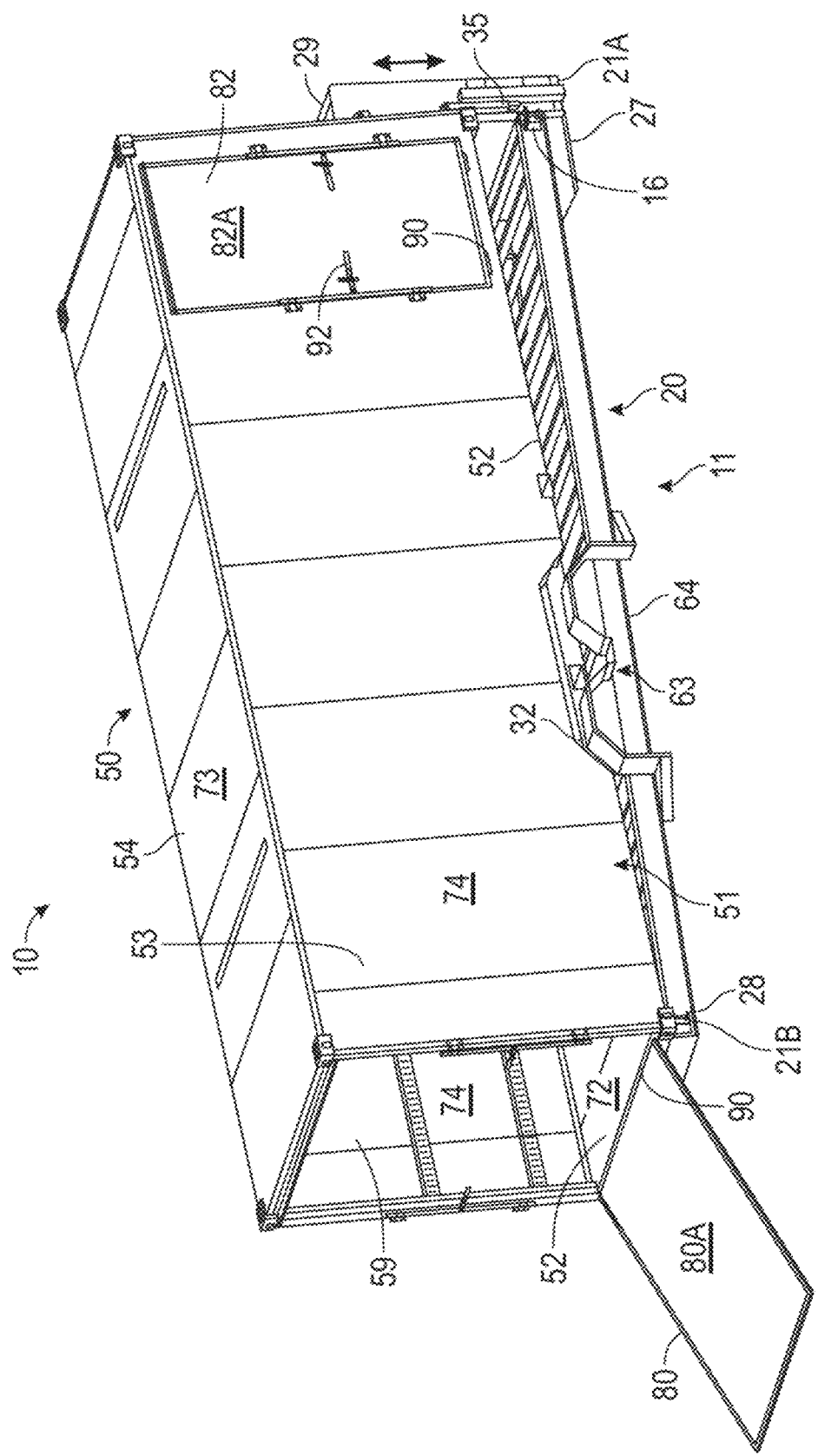
FIGS. 8A-8B is a schematic side-view perspective of a lightweight chassis and container or box lifted by lifting jacks and dual dollies for loading/unloading operations, according to embodiments of the disclosure.
Figure 8B:
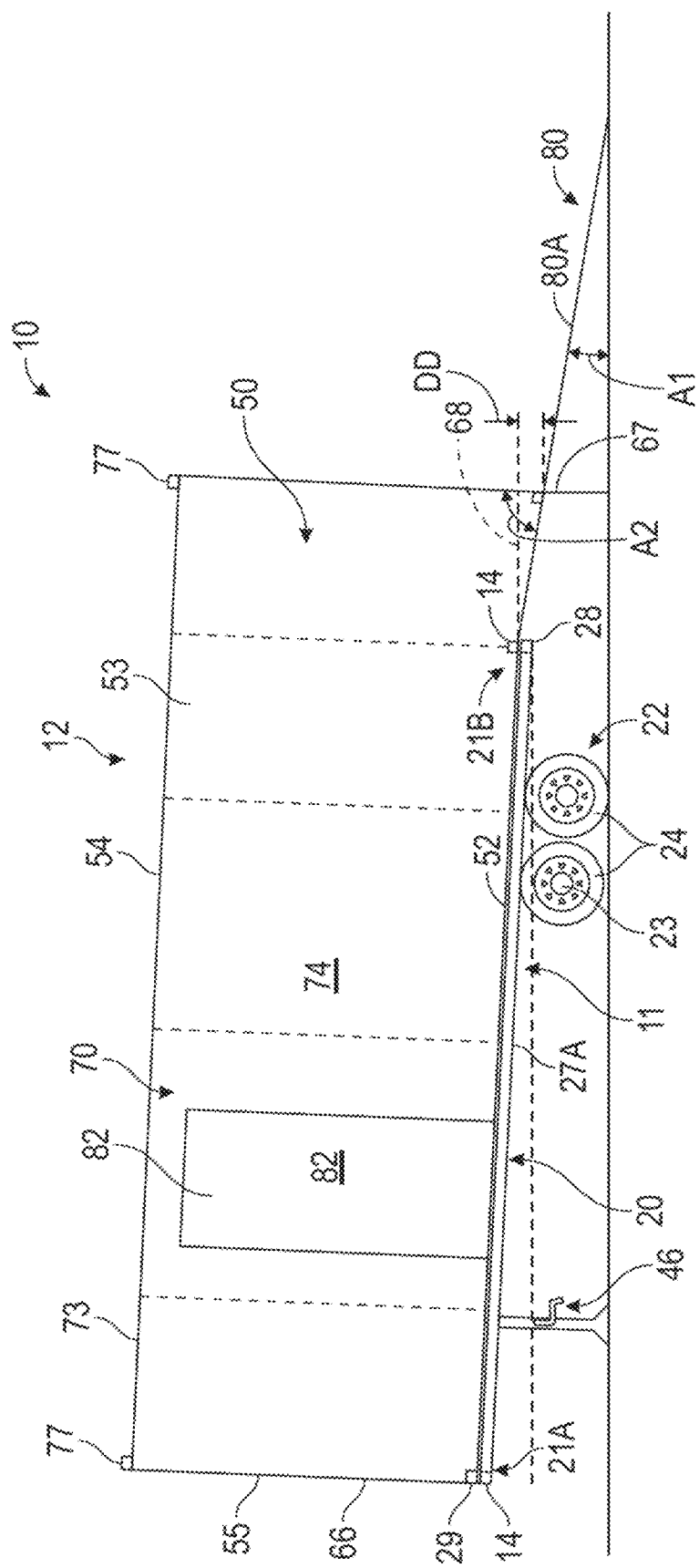

As generally illustrated in FIGS. 2 and 7A-7D, the lightweight chassis 11 may be formed as a trailer including a body or frame 20 having a first or proximal end 21A, a second or distal end 21B, and one or more sets of supporting wheel assemblies 22 arranged along the body. It will be understood that while 2-3 sets of wheel assemblies, each including an axle 23 and 2-4 wheels 24, are illustrated in the figures, additional or fewer wheel assemblies also can be used, and in embodiments, such as shown in FIG. 7D, each of the wheel assemblies further can include one or more wheels 24, as needed or desired.

Figure 3A:
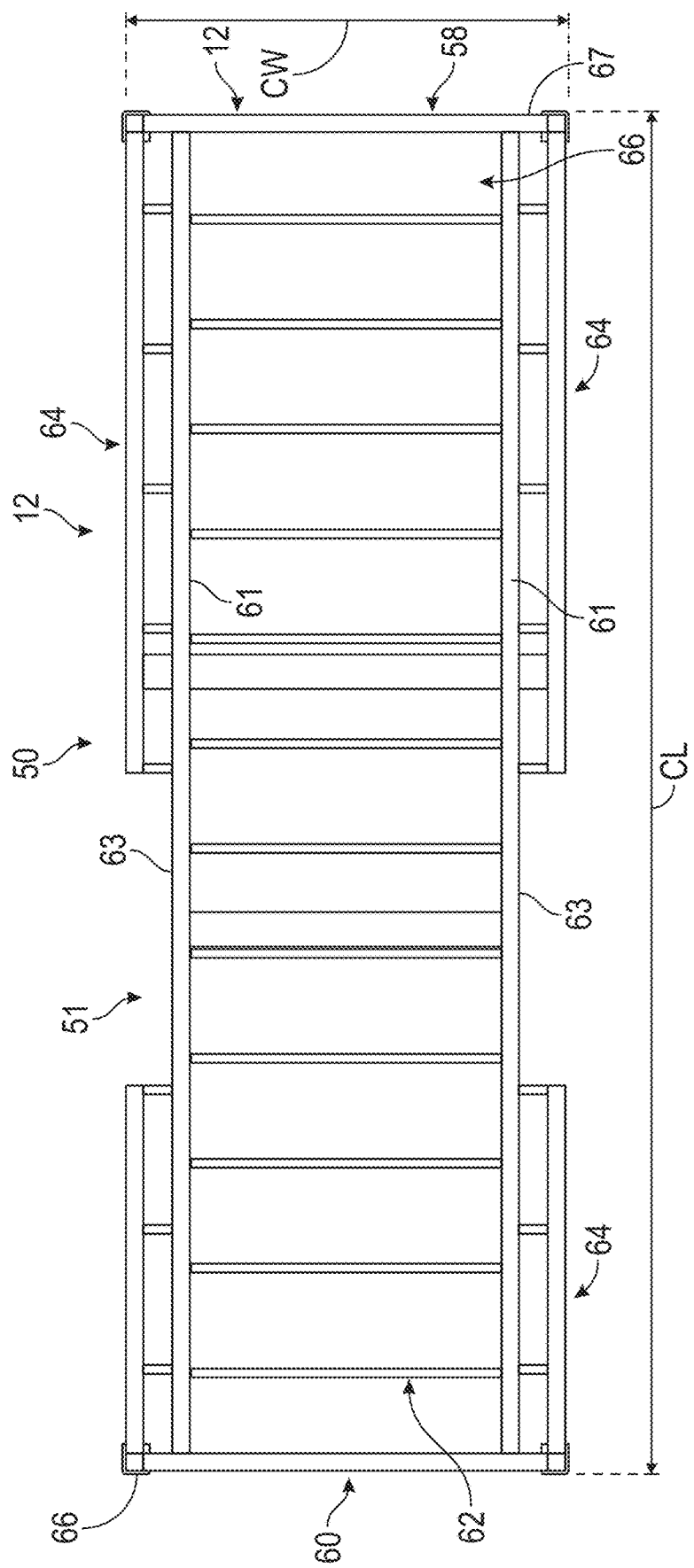
FIGS. 3A-3B are schematic views of a lightweight container or box according to embodiments of the disclosure.
Figure 3B:
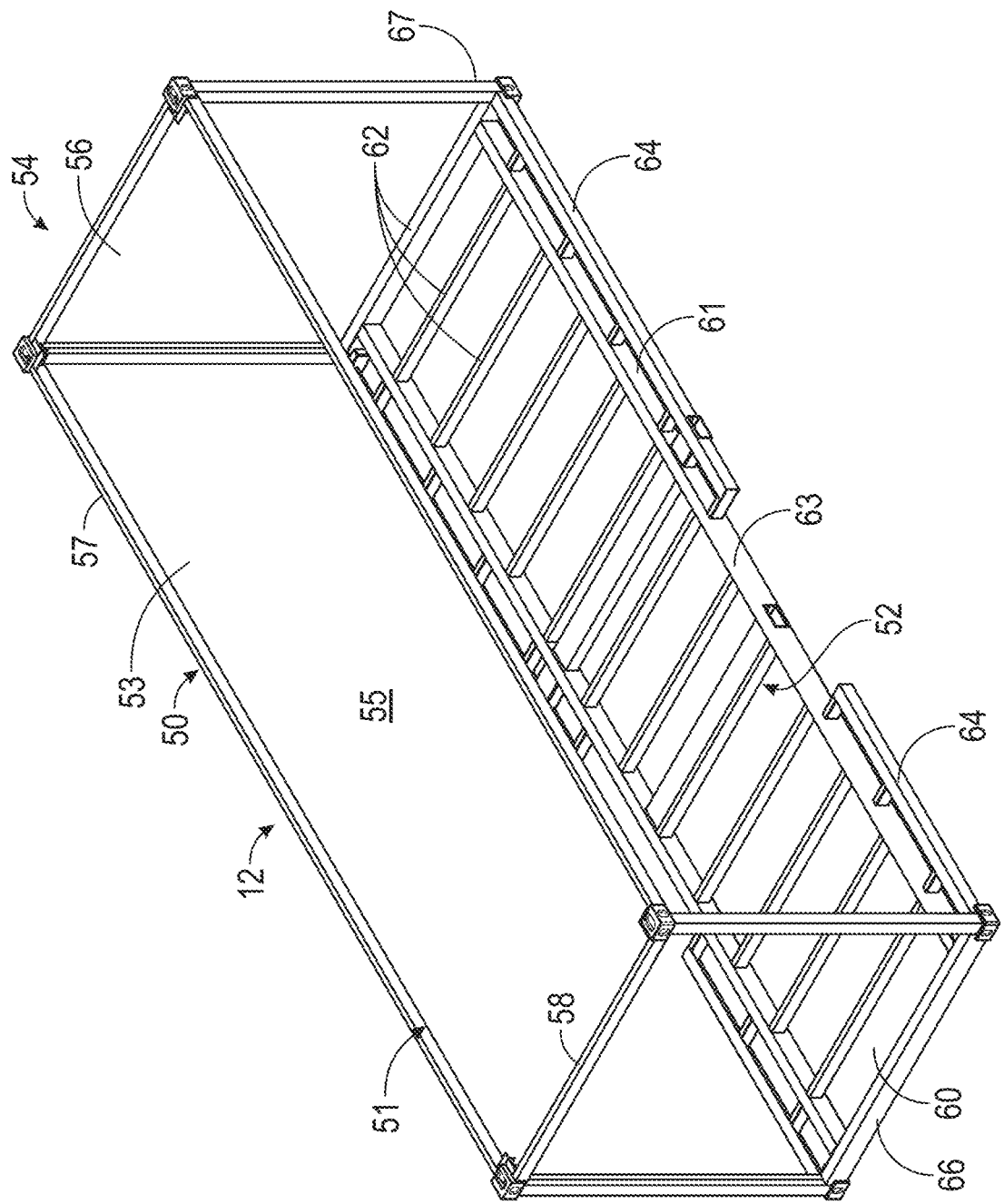

As further illustrated in FIGS. 3A-3B, in embodiments the frame 20 of the lightweight chassis 11 can be formed as a skeletonized framework 26 to further help reduce overall weight of the lightweight chassis. The body 20 generally will be formed from a high strength material such as steel, and in embodiments such as shown in FIG. 3A-3B, can include a pair of lengthwise extending side supports 27A and 27B, an end frame section or beam 28 located at the distal end 21B of the body, and a forward section 29 located at the first or proximal end of the body, 21A. Cross braces 31 generally will extend between the lengthwise side sections, defining a supporting bed or platform on which a container or box 12 will be received, as indicated in FIG. 2. In embodiments, the body of the lightweight chassis further can include fenders 32 extending over the wheel assemblies 22 as shown in FIGS. 1B-1C and 7A-7C.

FIGS. 7B-7D illustrate various alternative embodiments of the body or frame 20 of the lightweight chassis 11. In the embodiment shown in FIGS. 7B-7C, the frame 20 maybe formed with a pair of parallel, lengthwise extending frame sections 27A/27B that are spaced inwardly from the wheels 24 of the wheel assemblies 22, and which can include a series of cross braces 31 connecting the two lengthwise frame sections. An end frame section 28 is located at the second or distal end of the body, and a front section 29 further generally can be attached to the ends of the lengthwise extending frame sections 27A/27B by angled brackets or corner sections 33. Such a frame or body configuration can provide a further skeletonized or minimized framework to be used in various applications to help further reduce the overall weight of the lightweight chassis and the container or box of the system 10. FIGS. 7B and 7C further illustrate various configurations for the fenders 32 covering the wheel assemblies.

As further generally illustrated in FIGS. 1C, 1D, 2, 7A and 8B, the front section 29 of the body 20 of the lightweight chassis 11 can include a storage box 34 with a power system located therein and will couple the lightweight chassis to the drive vehicle 13. The power system can provide power for the operation of a pair of lifting jacks 35 mounted along the sides of the body of the lightweight chassis. The lifting jacks 35 (FIGS. 1E and 8B) can include hydraulic or pneumatic operated jack assemblies, as well as other types of jack assemblies, driven air/fluid, by Servo motors, or electric actuators. In some embodiments, the lifting jacks 35 can include various electric, hydraulic/pneumatic bottle jacks with at least an eighteen-inch travel distance and although lesser or greater travel distances also can be utilized, and a selected lifting capacity. For example, in embodiments, the lifting jacks can have a travel distance of between approximately twelve inches to approximately 30 inches, and a lifting capacity of approximately 6 tons to 10 tons, and in embodiments can have at least about an 8-ton lifting capacity.

In addition, while the lifting jacks are illustrated in FIG. 1E as generally being located along the sides of the front section of the body or frame of the lightweight chassis, in some embodiments, the lifting jacks also can be located at other positions such as being spaced inwardly from the sides of the chassis frame. For example, as indicated in FIG. 7D, the lifting jacks 35 can be located at positions speed inwardly from the sides of the frame with bolsters 16 provided at the outer edges of the frame at each corner.

The front section 29 of the body 20 of the lightweight chassis 11 also can incorporate a hitch connection 40 for coupling the lightweight chassis 11 to the drive vehicle as indicated in FIGS. 1A, 1B and 2. The lightweight chassis can be connected to the drive vehicle in various ways and using various mechanisms, for example, as shown in FIG. 2, the hitch connection 40 can comprise a gooseneck connection or trailer hitch be used, with the hitch connector including extended arm or neck portion 41 that extends from the forward section 29 of the body of the lightweight chassis along a raised elevation and projecting forwardly to a free end that can be coupled to a hitch post 42 or similar connection for securing the lightweight chassis to the drive vehicle, while still enabling pivoting or turning movement of the lightweight chassis as needed.

In an example embodiment, the drive vehicle can comprise a heavy-duty pickup truck having a flatbed with a vertically extending post or connector to which the free end of a gooseneck type hitch connection is releasably coupled. In addition, the power cables can be extended between the drive vehicle and the front section of the body of the lightweight chassis, in some embodiments, extending along the hitch connection for providing power and/or hydraulic fluid or air as needed for operation of the lifting jacks. It further will be understood by those skilled in the art that other hitch connections also may be utilized, such as a rear receiver hitch, a fifth wheel hitch, pintle hitch, bumper hitch, weight distribution hitch, or other types of hitch connections adapted for connecting the lightweight chassis to a pickup truck or similar drive vehicle.

In addition, as illustrated in FIGS. 7A and 8A, dual dollies 46 can be located along the frame 20 of the lightweight chassis 11 adjacent its first or proximal end 21A. The dual dollies 46 generally can be spaced rearward of the front section of the body, and can include conventional, manual operated or powered dollies, operable to lift and support the front of the lightweight chassis while not in transport, and when decoupled from the pickup truck or other drive vehicle. The dual dollies 46 further can be adapted to lift the front of the chassis, with or without the container or box attached to the chassis, to help stabilize and support the lightweight chassis and container or box such as during placement of a container or box thereon, and during loading or unloading operations.

In addition, the corner castings 14 can be provided with twist locks, and in embodiments, can include rotating corner castings. The corner castings will be configured to receive pin connectors or other, similar connections mounted to the corners of the container or box to receive and potentially fix or locate the container or box on top of the body of the lightweight chassis, as indicated in FIGS. 1C and 1E.

FIGS. 3A-6B illustrate one or more containers or boxes 12 according to embodiments of the present disclosure. For the purposes of illustration and not limitation, in one embodiment shown in FIGS. 3A and 3B, each container or box 12 may include a rectangular body 50 with an internal frame 51, and will include a floor 52, side walls 53, a roof 54 a front wall 55, and an interior chamber 59 defined therein. Other body configurations also can be used. The frame 51 can include an upper section 56 including a pair of parallel lengthwise extending beams or supports 58 and a pair of widthwise extending beams or supports. As indicated in FIG. 3B, the frame also can include a lower section 60 having parallel, lengthwise extending side rails 61 with cross beams 62 extending therebetween.

In addition, in embodiments, recessed areas or sections 63 can be provided along each side of the lower section and can be configured to receive or fit about the fenders covering the wheel assemblies of the lightweight chassis. For example, in embodiments such as illustrated in FIG. 3A, the floor section can be formed with a series of outer side rails 64 that can be spaced outwardly from the side rails of the floor section, with each of the outer side rails having a length that is less than the length of the inner side rails 61 of the floor sections. The spaces or recesses 63 defined therebetween will be configured to receive the fenders of the lightweight chassis.

As also indicated in FIGS. 1C, 2, 4A-4B, 5A-5E and 8A-8B, each container will have a first or front end 66 and a second or rear end 67, with a rearward section 68 (FIG. 8B) further defined adjacent the rear end. The rearward section 68 may extend along a selected distance or length from an intermediate point along the floor, terminating at a rear end of the container, the rearward section further oriented and extending at an angle downwardly for a selected drop distance. For example, in embodiments, the rearward section may extend approximately the last 3-5 feet (in some embodiments extending about 4 feet) of the bottom of the container and will drop about six inches at the rear end thereof, defining a loading angle or slope A1.

Such a construction can enable the containers or boxes to be placed directly upon the bed of one frame of the lightweight chassis body, rather than having to sit above the fenders of the lightweight chassis, and without requiring fenders to be integrated within the containers or boxes so as to enable their removal as needed. In addition, the construction of the containers or boxes in the lightweight chassis further enables the containers to be located at a lower elevation with respect to the ground, e.g., have a lower ground clearance further enabling ease of unloading and loading of the containers or boxes.

As illustrated in FIGS. 5A-5E, the containers or boxes 12 also may include an outer skin or covering 70, which typically can be formed from a series of panels 71 attached to the frame 51 of the container or box. The panels 71 also can be engaged with adjacent panels along common edges or seams, for example engaging in a shiplap or tongue and groove engagement. Side rails further can be mounted along the interior sides of the container or box, which can further secure the panels along the lengthwise extending sides of the container or box, as well as providing points or areas of connection, such as for connection of straps or for hanging other product supports. The floor 52 of each container or box may include floor panels 72, its roof can include panels 73 and its side walls can include panels 74, installed in similar fashion. In embodiments, the panels used for the skin, roof and floor of the containers or boxes can include composite panels having a lightweight, metal sandwich type construction. For example, the panels can include a core having a fluted or corrugated structure sandwiched between or bonded to opposite metal facing sheets of varying thicknesses. The core of each panel can be bonded or affixed to its facing sheets by an epoxy or aircraft grade adhesive materials, and/or using various types of fasteners, such as rivets, etc.

An example of such a lightweight metal sandwich panel includes CellTech® panels from CellTech Metals, Inc. Such composite sandwiched panel designs can have an open airflow or bidirectional corrugated structure and can be formed from steel or a combination of steel and other materials such as aluminum and/or composite, creating a lightweight multilayer sandwich design. In addition, different thickness and strength metal sandwich panels can be used for different sections of each container or box. For example, thicker panels with higher resistance to bending and increased compressive strength can be utilized along the floor section and for the side end door panels (which for the ramps) of each container or box, while panels having lesser thicknesses and different mechanical properties, including various compressive strength, bending stiffness, and sheer stiffness properties can be utilized for the sides and roof of each container or box.

For example, the floor panels can include panels having a steel construction with a thickness of approximately 0.40 to 0.60 inches, and with a weight of less than approximately 700 pounds; and in embodiments can have, a thickness of about 0.30 to 0.35 inches and a weight of about 650 to 680 pounds. The floor panels can extend across the floor section of the frame of each container or box with varying widths and may be mounted in a substantially side-by-side engaged arrangement. Each of the floor panels further can have a maximum bending moment of up to approximately 900 lb.-in/in in a lengthwise direction and up to approximately 1,000 lb. in/in/inch in a widthwise direction, with a transverse sheer stiffness of approximately 29-30 ksi in a lengthwise direction and approximately 50-60 ksi in the widthwise direction, and with a compressive strength of at least 480 lb./in$^2$.

The side panels can have similar steel construction with a thickness of approximately 0.295-0.35 inches, a weight of approximately 350 to 400 pounds, and in embodiments, a thickness of about 0.30 to 0.31 inches and a weight of about 370-380 pounds. The side panels can be formed with a length sufficient to extend between side frame members of the upper section and the lower section of the frame 51. The side panels further can have a maximum bending moment of approximately 200-250 lb. in/in in the lengthwise direction and approximately 300-350 lb. in/in in the widthwise direction, a transverse sheer stiffness of between approximately 25-35 ksi in the lengthwise direction and approximately 60-70 ksi in the widthwise direction, with a compressive strength of approximately 900-1,000 lb./in$^r$ inch. Similar or lesser thickness sandwich panels also can be used for the roof of each container or box.

The weight of the panels used in the container or box can be substantially minimized, e.g., in embodiments, down about 3000 lb. or less. As a result, the use of such lighter weight metal sandwich panels can provide potential weight savings for the overall lightweight chassis and container or box of the present system of between approximately 70-80%, as compared to equivalent solid steel plates of a similar thicknesses.

As further indicated in FIGS. 6A-6B, the floor panels 72 also can include or be covered/configured with a loading guide or markings 76. Such loading guide/markings can be configured to provide directions or indicators for use in locating packages within particular areas or spaces of the interior chamber of the container or box to facilitate efficient loading and unloading or package of different configurations. The markings can include permanent or non-permanent markings, such as being formed as removeable decals or adhesive-backed sheets that can be printed with different size/shape spaces indicated and applied to the floor to provide indicators to an operator or other person loading the container or box with a particular cargo load as to the placement of packages by size, configuration and/or based on a delivery schedule.

Thus, the cargo load does not have to be initially warehoused until all of the goods of the cargo load have been obtained/arrived and then organized or arranged outside the container or box and then loaded in a specific first in-last out type of order. Instead, the packages of the cargo load can be dynamically loaded as the goods are received, thus enabling true cross-docking whereby goods can be loaded substantially directly after receipt, improving warehouse efficiency and reducing handling and storage of goods. While the loading guide 76 is shown in an embodiment as a grid with similar size spaces, various other configurations, including different size and shape loading spaces, and which can be labeled with numbers, letters or other identifiers, also can be used.

Figure 4A:
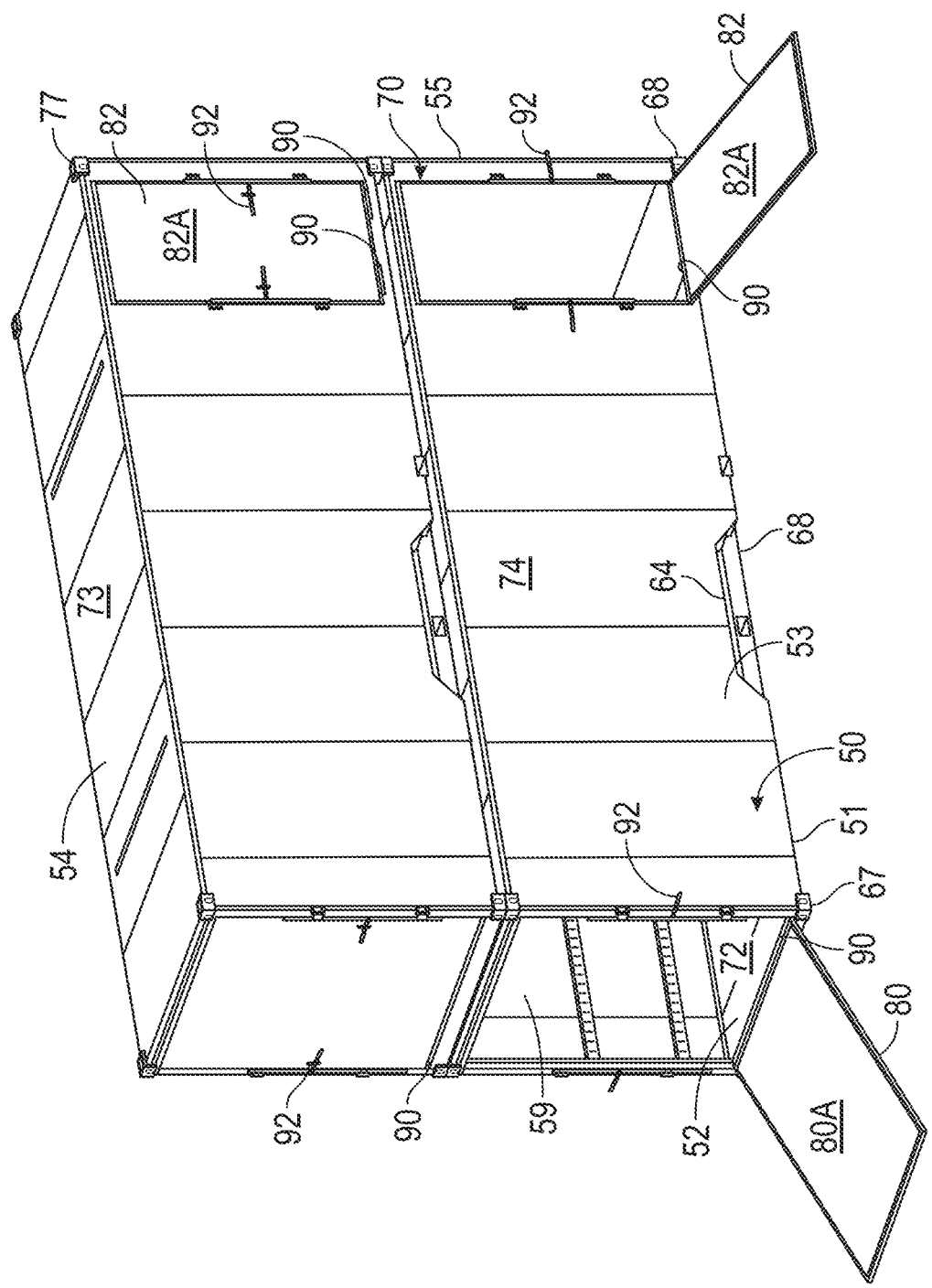
FIG. 4A is a schematic side view of a pair of stacked lightweight containers or boxes with open side and end door panels, illustrating stacking of one container or box another, according to embodiments, of the disclosure.
Figure 4B:
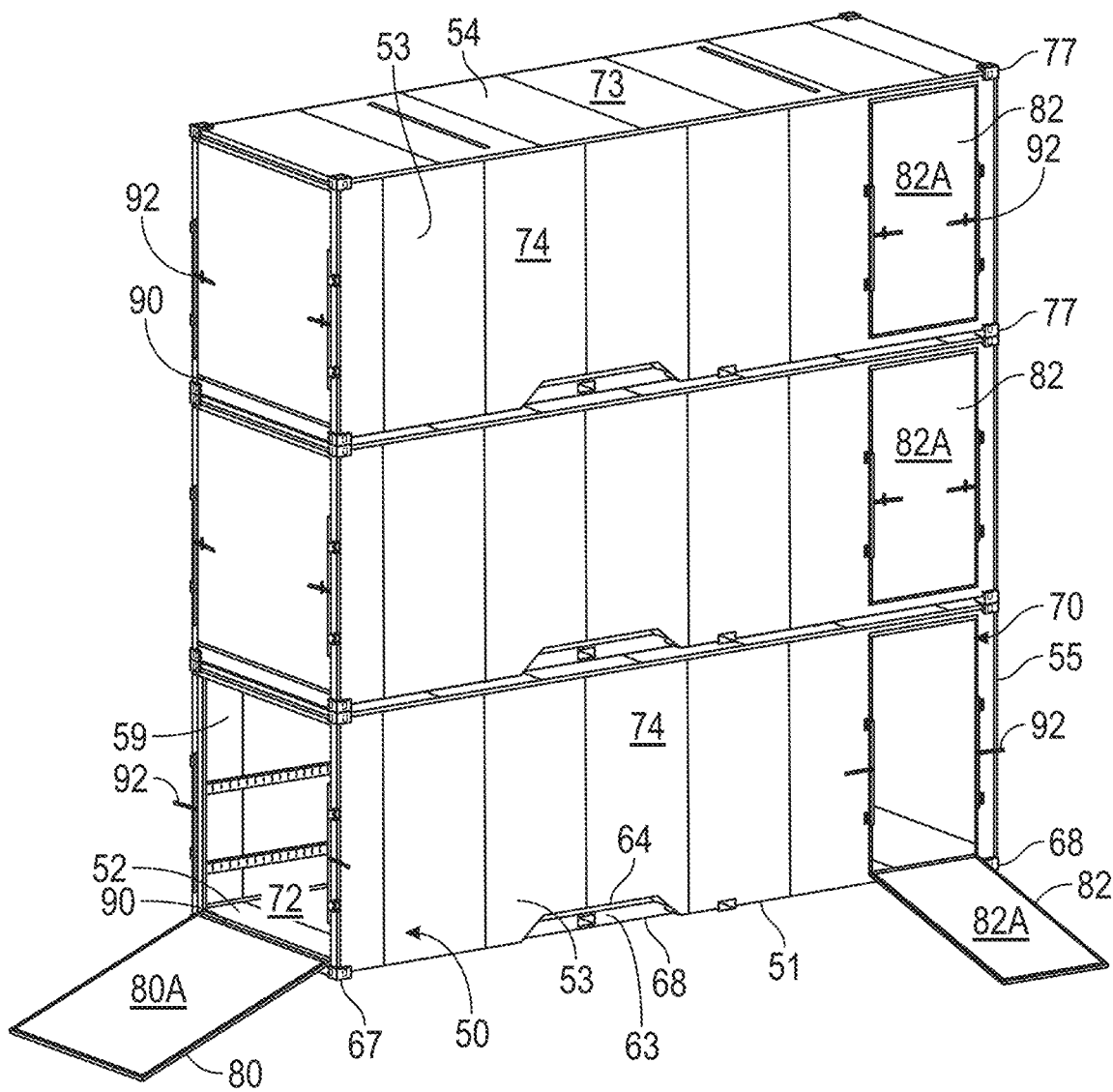
FIG. 4B is a schematic side-view of a three stacked lightweight containers or boxes, illustrating stacking of one container or box another according to embodiments of the disclosure.

In addition, stacking cones 77 can be provided at each of the corners, along the upper and lower sides of each container or box. The stacking cones can be configured to seat on and engage with stacking cones of other containers or boxes. As a result, as indicated in FIGS. 4A-4B, a series of containers or boxes can be stacked, one on top of another for storage when not being used for transport. In embodiments, the containers or boxes can be stacked two to three containers or boxes high, and in other embodiments, up to four containers or boxes can be stacked together. By way of example, FIG. 4A shows a pair of containers or boxes 12 staked one on top of another while FIG. 4B shows a series of three containers or boxes stacked on top of each other. In addition, as shown in both FIGS. 4A-4B, in such stacked configurations, the lower lightweight containers or boxes 12 may still be loaded, using the end door panel and one or more side door panels. Thus, while a series of containers can be stacked to conserve space and to provide storage of empty containers or boxes and/or containers or boxes loaded with goods prior to use for transport and delivery of goods, loading and the lower containers or boxes can still be accomplished.

The containers or boxes also can have stacking cones or receptacles arranged along the bottom surface of each of the containers or boxes, which can be configured to receive the corner castings of the chassis frame, stacking cones of another container or box, as well as receiving container casters 78 (FIG. 5B). The casters 78 can include rotating casters having a pair of wheels 79 attached to a frame that can have a locking section and pin configured to be received within the lower stacking cones of the containers or boxes and engaged or locked. The casters further can include brakes and swivel lock mechanisms that, when unlocked, allow movement and pivoting or rotation of the casters, and, when locked in position, restrict movement of the containers or boxes. In embodiments, the container casters can be configured to support containers and cargo therein up to approximately 25,000 pounds. In addition, handles can be provided along the side walls of the containers or boxes to help in their movement when supported on their container casters.

Figure 4C:
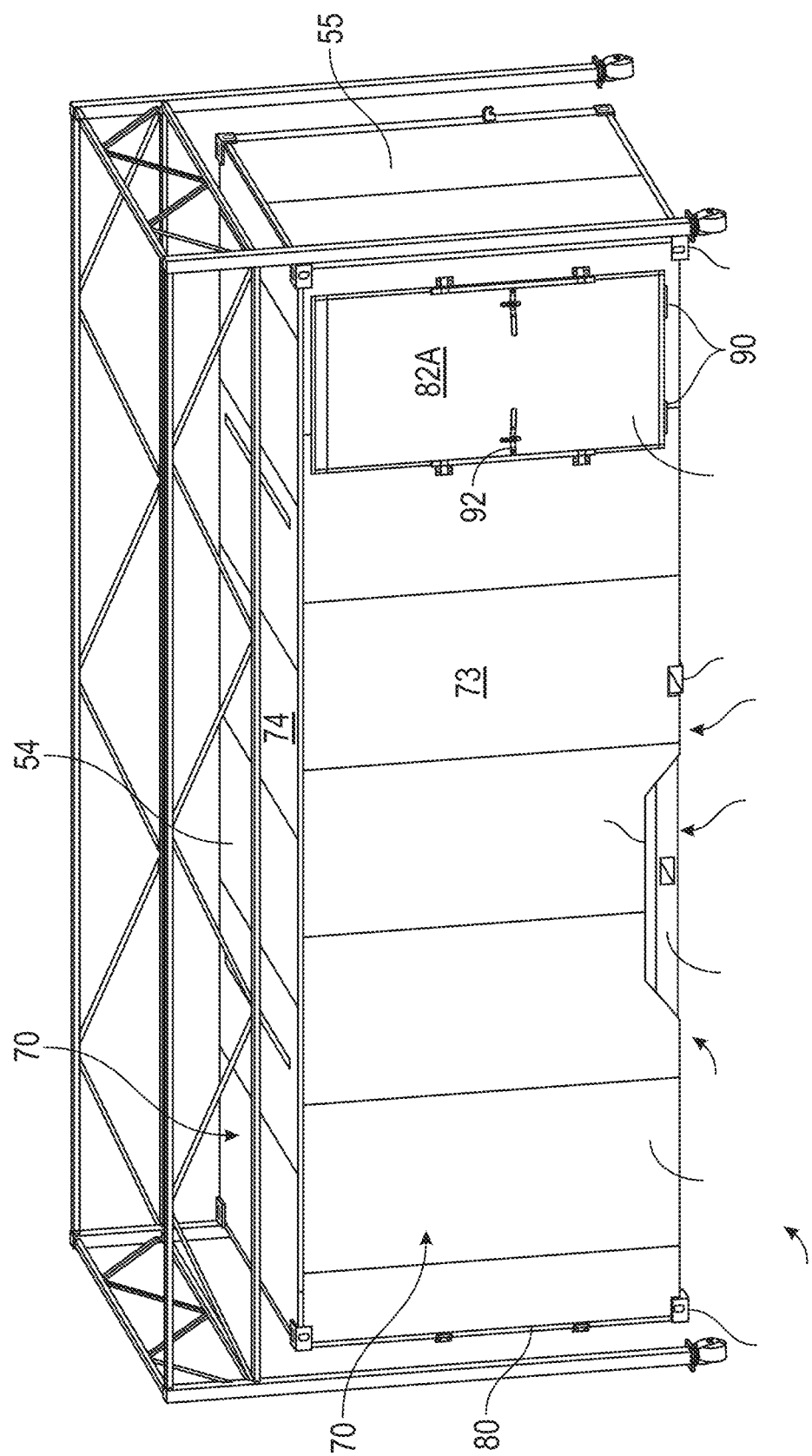
FIG. 4C is a perspective view of a container or box and a lifting frame according to embodiments of the disclosure.

The containers or boxes can be loaded on to and removed from the chassis and also can be stacked and unstacked such as by use of a forklift, and as indicated in FIGS. 4A-4B, can include lifting slots or openings in the frame thereof to receive the forks of a forklift or similar loader. FIG. 4C illustrates another embodiment in which a lifting frame 75 can be used to lift a container or box, such as for placing the container or box onto the chassis or removing it therefrom. The lifting frame can include an upper support and legs that can be configured to be extended or lowered for lifting and/or placing the container or box. The lifting frame further can include wheels, such as casters 78 to enable/facilitate movement of the container or box manually by one or more workers, and without necessarily requiring use of a forklift or other motorized device.

In addition, as further illustrated in FIGS. 5A-5E, each container or box 12 further will include at least one end door panel 80 pivotally attached to the second or distal end of its container or box at one end, such as by hinges, and having a free end opposite the hingedly connected end. The end door panel 80 will be pivotable in a downward direction such as shown in FIGS. 5D-5E, so as to provide a ramp 80A along which cargo can be loaded and unloaded from the rear of the container or box.

In addition, as also shown in FIGS. 5D and 5E, each container or box further can include one or more side doors 81 and 82. Such side doors can be mounted at offset positions along the sides of each container or box, and can be similarly pivotally attached to the frame of each container or box so as to be pivotable downwardly from a closed position to a lowered position to provide additional ramps 81A/82A and openings along the sides of the container or box and through which cargo or goods can be loaded and unloaded from the interior of each container or box. The side and end door panels similarly generally will be formed from a lightweight, metal sandwich material similar to materials used for the floor, side and roof panels. In embodiments, the end and side door panels 80, 81 and 82 and can have a greater thickness to provide increased strength, stiffness and resistance to bending as cargo is loaded and unloaded from the interior of each container or box via the ramps defined by each end and side door panel.

Each of the side and end door panels generally will be pivotally attached to the body or frame of its container or box by hinges 90 such as indicate in FIGS. 1B and 5B-5E. In addition, in embodiments, the side and end door panels can be moved between their raised, closed positions and their lowered, opened positions manually by an operator or driver, or by an actuator such as a motor or hydraulic/pneumatic or electric actuator.

In addition, each of the side and end door panels can include weather-stripping or other sealing material or gasket to help seal and provide resistance to water entering into the container or box when the side and end doors are in a raised, closed position. Locking mechanisms 92 also can be provided for securing the side and end door panels when in their closed positions.

In addition, each container or box also can be provided with slots or pockets defined along the floor section of the frame of each container or box, which pockets can be configured for the receive forks of a forklift, straps, or other mechanisms for use in lifting of the containers or boxes such as for stacking or removal from the lightweight chassis. Electrical outlets also can be provided within the interior chamber of the container or box, being connected to the power source of the chassis, and, in embodiments, the container also can include a light or lights inside the container to illuminate the interior chamber, and/or along the outside of the container or box to illuminate an area around the periphery of the container or box. In addition, handles can be provided along the sides of the containers or boxes, to assist in movement of the containers or boxes when sitting on container casters.

In addition, in embodiments, the system 10 further can be provided with a cargo lift mechanism, such as hand trucks or on pallet jack, which can be received within the interior of each container or box, such as fitting into a recessed area or receptacle, or loaded with a portion of the cargo received therein. In some embodiments, an automatic cargo lift device, such as a Domino™ Stairclimber from Zonzini SRL can be provided, equipped with a loading transport platform and treads or a similar mechanism for movement along uneven surfaces such as stairs. Thus, a single operator or driver can be used for most deliveries.

In embodiments, a method is provided for transporting, shipping and/or delivery of various sized goods/commodities including H3D goods or commodities utilizing the system 10 including embodiments of a lightweight chassis and container or box disclosed herein. In some application, the container or box can be received or placed onto a lightweight chassis 11, as indicated in FIG. 2, can be secured in place by corner castings attached along the frame 20 of the chassis. To initiate a loading or unloading operation, the front end of the chassis 11 generally will be raised such as by actuation of a pair of lifting jacks and/or dual dollies 46 located along the front end and sides of the frame 20 of the chassis.

In embodiments, the front end of the chassis can be lifted by approximately 12 inches, which correspondingly will lift the front or forward end of the container by approximately 12 inches. As a further result, the floor of the container can be provided with a slope or angle of about 20°-24°, and in embodiments about 21°-22°. Thereafter, the dollies can be secured and locked in a lowered position in engagement with the ground surface to support the first or front end of the chassis frame and the front end of the container or box. Thereafter, the end door panel 80, the rear end of the container or box can be pivoted or otherwise moved to its lowered, loading position, such as shown in FIGS. 8A-8B, with the free end of the end door panel resting on the ground surface, and thus defining a loading ramp.

As indicated in FIG. 8B, the raising of the front end of the container or box by approximately 12 inches, which also provides the floor of the container with a slope of about 20°-24°, together with the selected or designed drop distance of the rearward section of the floor of the container or box (e.g., a drop distance of approximately 6 inches over a length of approximately 4 feet) substantially reduces or eliminates the apex of the angle of the loading ramp defined by the end door panel, and the floor of the container or box with respect to the ground. As a result, as indicated in FIG. 8B, the loading ramp will extend from the surface of the ground to the floor of the container or box with a substantially straight or flat transition between the end of the ramp and the floor along the rearward section of the container or box; with the angle A1 between the free end of the ramp 80A and the surface of the ground being approximately the same as the angle A2 between the opposite end of the ramp 80A and the floor of the container or box. Such a smooth, substantially unbroken transition of the ramp to the floor of the container or box can enable loading and unloading of the container or box using conventional pallet jacks or hand trucks, with the potential for such pallet jacks or hand trucks being engaged or blocked by the apex or raised transition between the ramp 80A and the floor of the container or box being virtually eliminated. This further can enable a single driver or operator to load and unload most types of cargo, even H3D commodities or packages, further saving labor costs.

In addition, as indicated in FIGS. 6A and 6B, in some embodiments, the container or box can be provided with a loading guide or markings 76 can be used to assist a driver or operator in loading cargo into the interior chamber of the container or box, with varying size packages being placed or located according to an optimized loading plan. Such a loading plan can be determined prior to the goods making up the cargo load being received at the warehouse or other loading location, and can be used to help guide the driver or operator or other personnel loading the container or box as to the placement of packages based on size, weight, configuration, and/or delivery schedule. For example, the loading guide can provide a grid or a series of outlined spaces that indicate where certain size goods should be placed; and, by providing the container or box with additional side door panels that can be pivoted or lowered to a lowered, loading position as indicated in FIGS. 5D and 5E, greater accessibility to the packages of the cargo load received within the container or box can be provided for unloading.

As a result, rather than having to receive and assemble all of the packages making up a cargo load at a warehouse or other receiving facility prior to loading the cargo load into the truck or trailer, typically using a first in-last out, type of methodology, individual packages of the cargo load can be placed into the interior chamber of the container or box at selected or prescribed locations as received, according to the loading guide laid out on the floor of the container or box through each of the end and side door panels. Having the side door panels in addition to the end door panel further enables greater flexibility in loading and unloading of packages from the container or box. In addition, in some embodiments, the loading guide can be comprised of a series of sheets that can be created or configured with a layout for a particular cargo load to be transported and can be releasably or removably applied to the floor of the container or box and after completion of the transport operation, can be removed and/or substituted for a different loading guide or series of markings.

FIGS. 9A-9F illustrate an additional embodiment of a loading system 100 utilizing a lightweight chassis 101 and a container or box 102 in accordance with principles of the present disclosure. In the present embodiment, the loading system 100 can be configured or adapted to enable the loading and/or unloading of a container or box 102 onto and off of a lightweight chassis 101. For example, the loading system 100 of the embodiment shown in FIGS. 9A-9F can be used for applications such as delivery and/or pickup of storage boxes, e.g., self-storage boxes that can be delivered to commercial or residential locations for use as temporary storage, or for loading at such a commercial or residential property for later pickup and transport.

As illustrated in FIGS. 9C-9F, in embodiments the chassis 101 can be provided with a slightly raised or increased height such that a frame or body 105 of the chassis 101 is spaced above the wheels 24 on which the chassis is supported. In addition, the fenders, such as illustrated in other embodiments as shown in FIGS. 1B-1C and 7A-7D, can be removed to help streamline the chassis such that the container or box 102 (FIG. 9A) can be seated directly on the chassis frame or body, without fitting over or otherwise receiving such fenders or other obstructions therealong. In some embodiments, wheel covers or fenders with a lower profile or outwardly spaced configuration can be used. In embodiments, the wheels can be located along the chassis at a position to adjust or locate a center of gravity of the chassis to stabilize the chassis during loading and unloading.

As indicated in FIGS. 9A-9F, the chassis 101, can have a construction similar to other embodiments of the chassis 11, such as discussed above with respect to FIGS. 1A-22. For example, in the present embodiment, the chassis will include a frame or body 105 (FIGS. 9B-9F) of a generally rectangular construction with a first or front end 106A and a second or rear end 106B, a pair of linkwise extending side frame members or rails 107A and 107B, cross members 108, and an end frame beam 109.

In addition, a hitch connection 115 can be mounted on a pair of upstanding supports 116 located at the first or front end 106A of the frame 105. The hitch connection 115 generally can include a hitch connection such as a gooseneck hitch, rear receiver hitch, fifth wheel hitch, pintle hitch, bumper hitch, weight distribution hitch, or other type hitch connection adapted for connecting the lightweight chassis to a pickup truck or similar drive vehicle, including a hitch connection as described and illustrated with respect to any other embodiment of the present disclosure. In addition, a storage box or compartment 117 can be mounted between the supports 116 at the first or front end of the chassis. The storage compartment or box can provide storage for tools and can be configured to house hydraulics or other power source for lifting jacks 120 that can be mounted at the first or front end of the frame 105, as well as providing power to a loading/unloading system 125.

In embodiments, the container or box 102 will be configured to be loaded/unloaded from the chassis 101 by the loading/unloading system 125, and can have a similar construction to the container of box 12 illustrated above with respect to various other embodiments such as illustrated in FIGS. 1A-5E and 8A-8B. For example, the container or box 102 (FIG. 9A) may include a body 50 with a body 51, lengthwise extending a pair of sides 53, a floor 52, ceiling or roof 54, a front end 55, and a rear end 56. End door panels 80 and one or more side door panels also can be provided. As discussed above, the body of the container or box 102 further can include or be constructed with series of lightweight composite panels, such as formed from a metal sandwich type material, to help produce weight of the container or box.

Figure 9A:
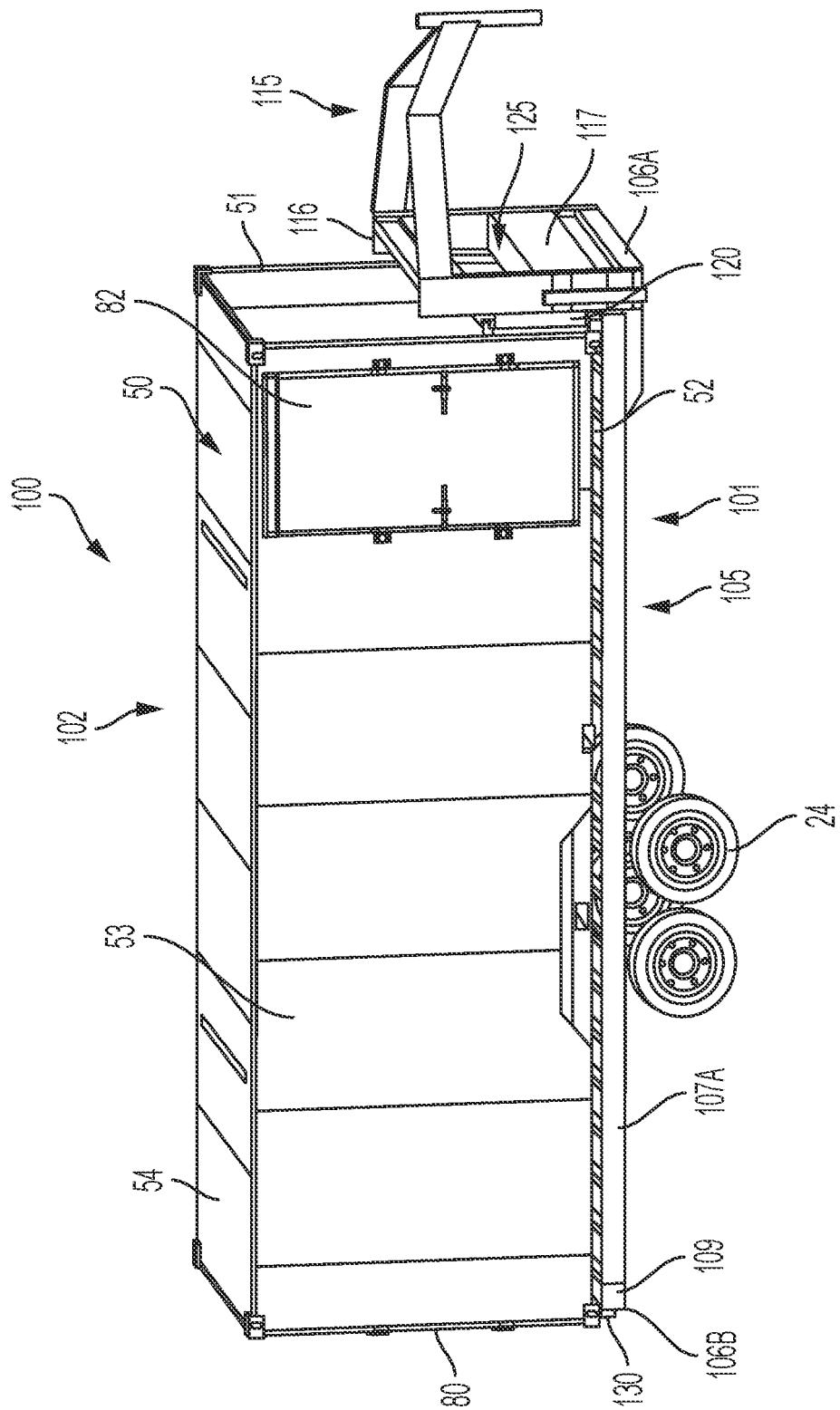
FIGS. 9A-9F are schematic views illustrating an additional embodiment of a lightweight chassis and container or box, and a process for unloading the container or box from the lightweight chassis, according to principles of the present disclosure.
Figure 9B:
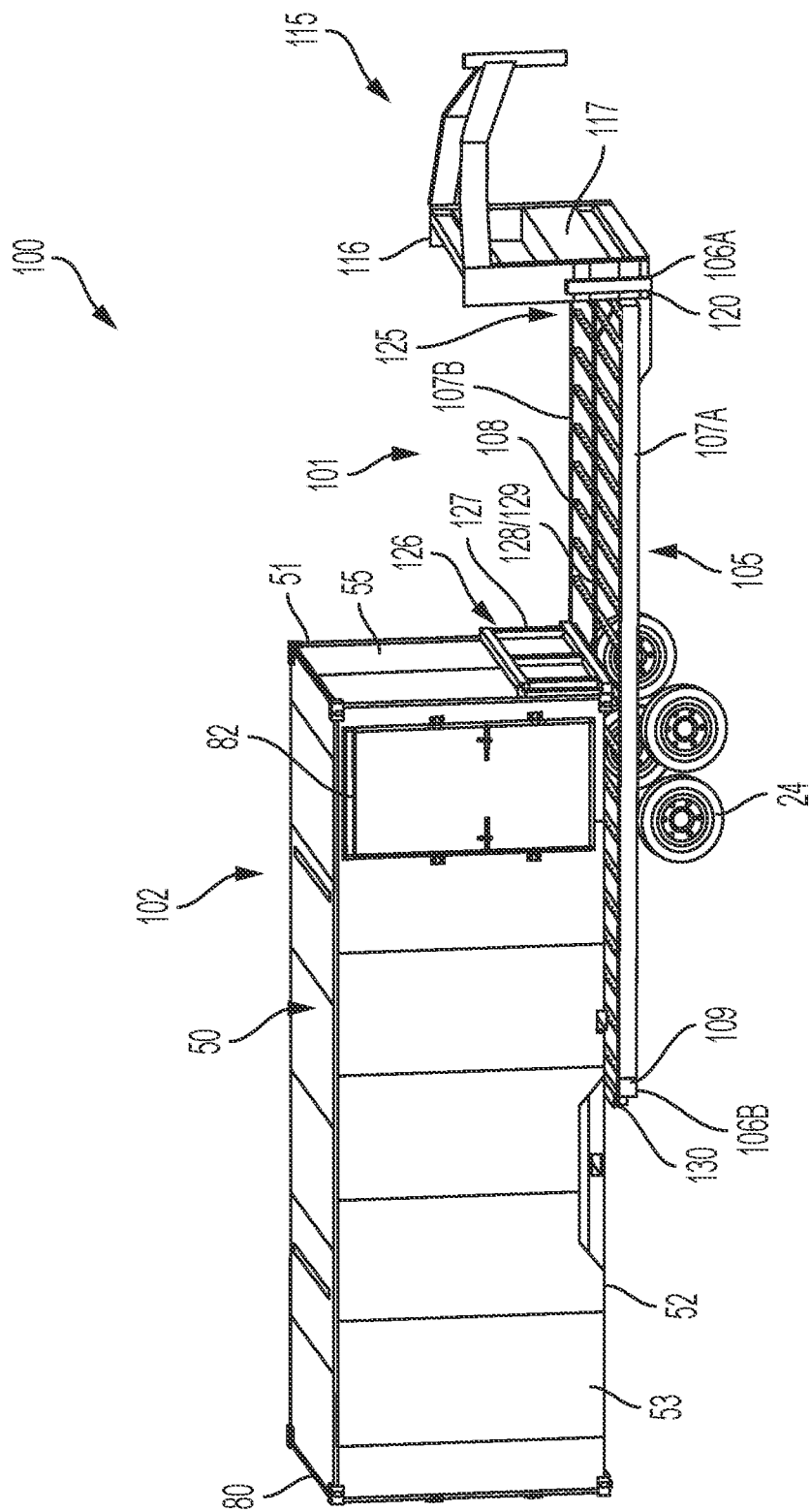
Figure 9C:
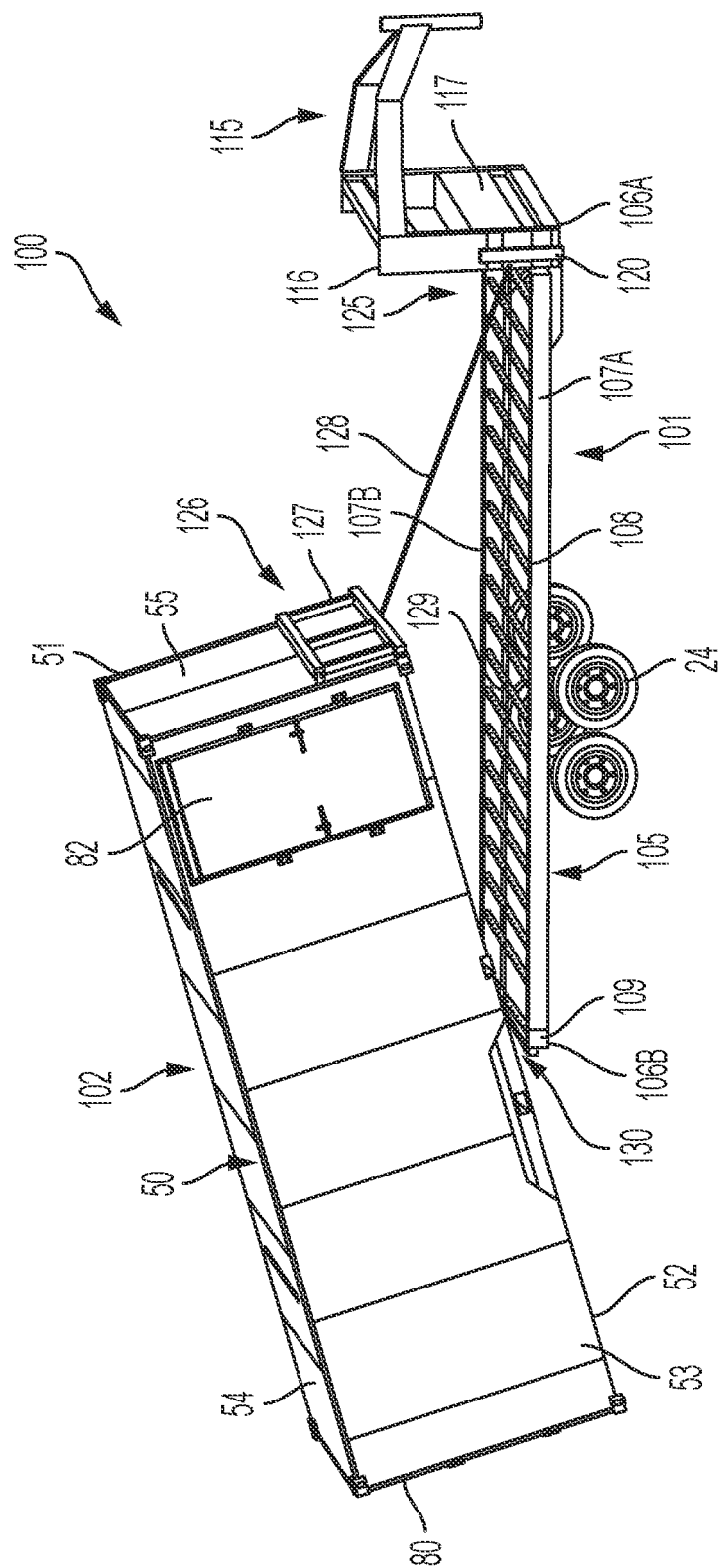
Figure 9D:
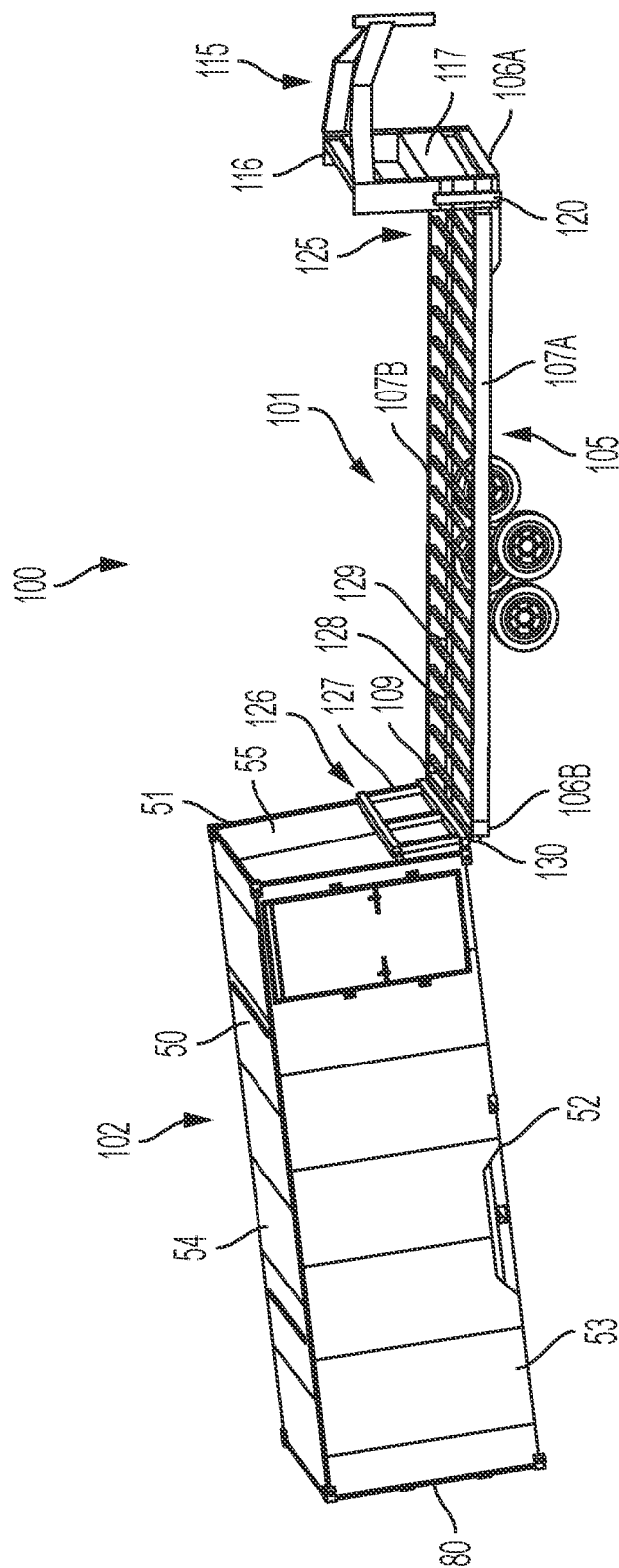
Figure 9E:
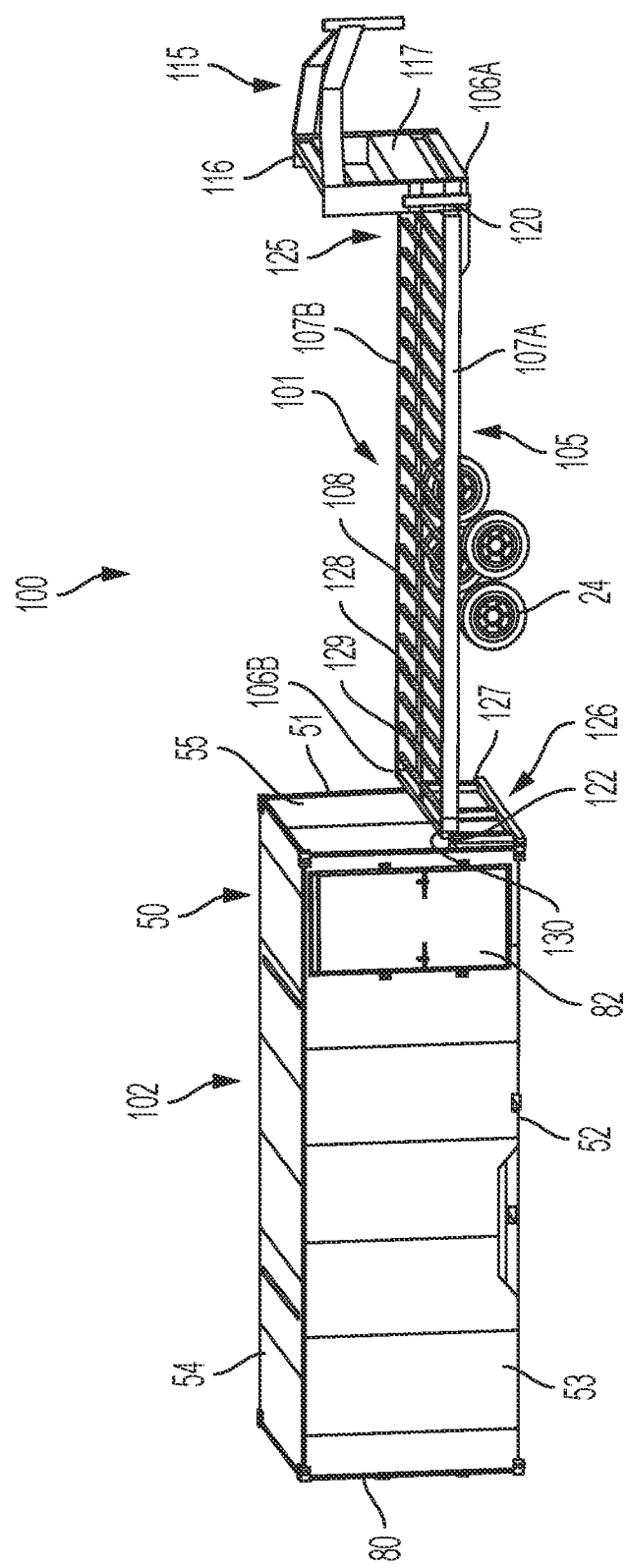

As additionally indicated in FIG. 9E, the front end of the container or box can include a pair of connectors 122 configured to releasably couple to clevis or loading/unloading frame 126 that can be provided as part of the loading/unloading system 125 for the containers for boxes. The connectors 122 are shown in one example embodiment as including hooks mounted to upstanding frame members on each side of the container or box at the front end thereof, and can include hooked protrusions or other types of connections, including lockable connectors.

As further indicated in FIGS. 9B-9D, the clevis 126 can include a frame or body 127, shown as having a substantially rectangular shape or configuration, with upper and lower frame members, side fame members, and one or more intermediate frame members. The clevis also can be provided with slots or other complimentary engaging portions or connectors that can be configured to receive and/or engage with and/or couple to the connectors 122 provided at the front end of the container or box.

In addition, the loading/unloading system 125 generally will include a winch that can be housed within the storage box or power compartment 117 provided at the first or front end of the chassis. The winch can include or be coupled to one or more winch lines, e.g. a winch line 128 connected to the clevis and a bottom winch line 129 that can connect to the container or box. The winch lines can be coupled at one end to the clevis and to the container or box at the opposite end to the winch mechanism to help control the movement of the container or box onto an and off of the frame of the lightweight chassis, as shown in FIGS. 9C-9D.

In addition, in some embodiments, one or more sets of rollers 130 can be provided at various locations along the frame of the chassis 101. For example, in embodiments, one or more rollers can be provided at the second or rear end of the chassis. In other embodiments, multiple sets of rollers can be provided at various locations along the frame of the chassis. The rollers can be configured to help guide the container or box onto and off of the frame of the chassis during loading and unloading operations as to help reduce friction and enable ease of transition and/or movement of the container or box along the frame of the chassis.

Alternatively, the slides or other, similar guides can be provided along the side frame members and/or at other locations along the frame of the chassis. Such slides can be formed from friction reducing materials such as various plastics, synthetic or composite materials. For example, in embodiments, an acetal resin material such as Delrin® from Dupont™ can be used. Other friction reducing materials also can be used. In embodiments, slides can be substantially integrated within or along the frame of the chassis, to help the friction during movement of the container or box onto and off of the frame of the chassis. In addition, in some embodiments, the slides and/or sets of rollers can be raised and/or lowered, either manually or by a hydraulic, pneumatic, electric, or other, similar actuators powered by the power system within the storage or power compartment, that can be operated to raise such slides or rollers into an engaging position against the bottom surface of the container or box as needed during loading and/or unloading of the container or box from the chassis.

In addition, in other embodiments, the cross beams and side frame members or rails of the chassis can be coated with a friction reducing/wear resistant coating that can be applied, such as by a spraying, vapor deposition (e.g. CVD or PVD), painting, plating or other applications, and which can be configured to provide enhanced corrosion and wear resistance. The coating material can act as a sacrificial coating that protects the chassis frame. In embodiments such as sacrificial coating, can include thin film ceramic coatings, metallic coatings or other coating materials, for example, not by way of limitation, coatings of zirconium nitride, boron nitride, titanium nitride, titanium aluminum nitride, titanium carbonitride, chromium nitride, chromium carbonitride, Tungsten nitride, Tungsten carbide, Tungsten/Tungsten carbide, boron carbide, aluminum chromium nitride, chromium carbide, molybdenum disulfide, molybdenum nickel, rhenium, Tungsten, chromium, graphite, diamond-like carbon (DLC), amorphous carbon, amorphous hydrogenated carbon, or any combination thereof. Such a coating can be designed to act as a sacrificial wear layer that can be reapplied, as needed or on a selected basis, to protect the frame of the chassis from friction and accelerated wear during loading and unloading operations of a container or box onto and off the chassis. In addition to providing reduced friction and ease of movement along of the container or box therealong, the use of a sacrificial corrosion, wear or friction resistant coating applied to the frame of the chassis can provide such protections to the chassis while avoiding significant addition of weight to the chassis.

FIGS. 9A-9F generally illustrate an operation for unloading of a container or box 102 from the chassis 101 in accordance with embodiments of the loading system 10/100 of the present disclosure. To unload the container or box, the corner castings locking the container or box to the chassis will be unlocked, after which the chassis can be lifted or raised, such as by use of the lifting jacks 120, to an angle sufficient to enable the container or box to slide rearwardly along the frame of the chassis. As the front ends of the chassis and the container or box are raised, the winch can be controlled to enable to the container or box to slide rearwardly along the chassis in a substantially controlled movement as indicated in FIG. 9B.

Figure 9F:
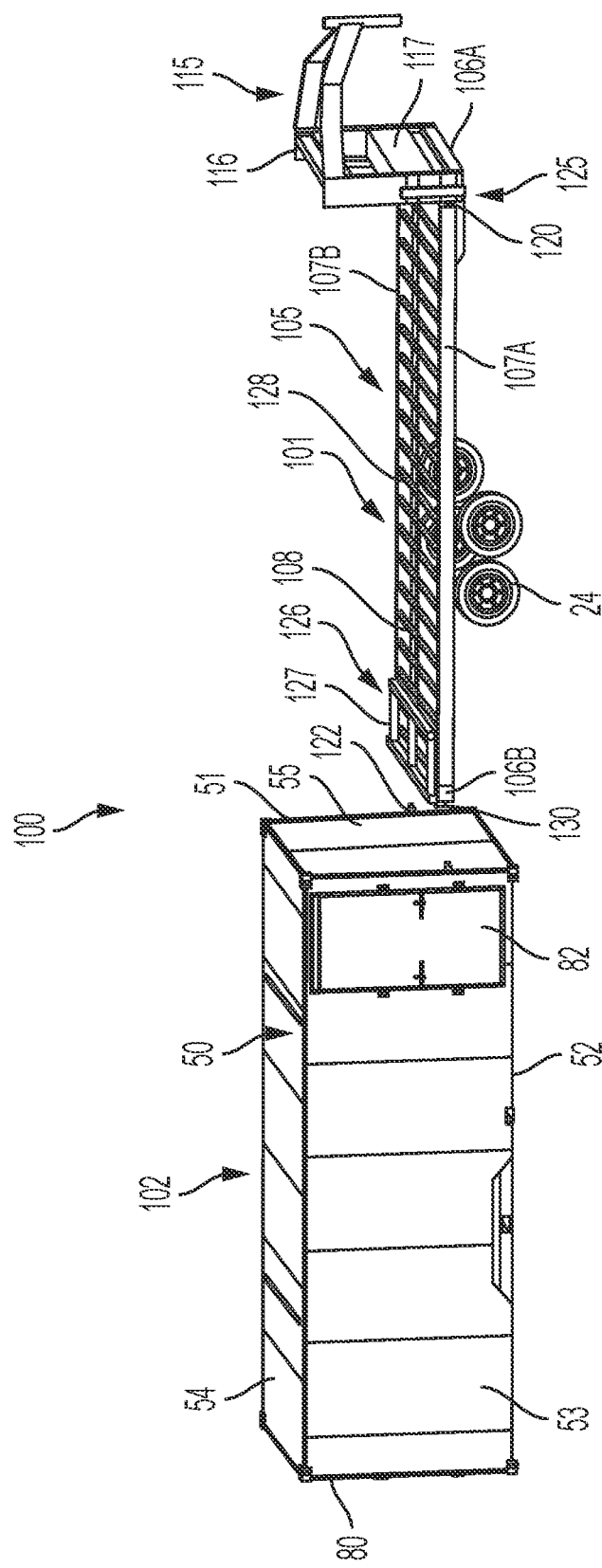

As indicated in FIG. 9C, the container or box can, during and unloading operation, tilt rearwardly, but will remain attached to the winch lines 128/129 and by the clevis 126, to help maintain tension and contact between the container or box with the chassis. As the front end of the container or box reaches the second or rear end of the chassis, the clevis can be lowered or otherwise moved downwardly so as to lower the front end of the container or box onto the ground or onto a supporting mechanism, such as a caster wheel, blocks or rails, or other, similar supports. Thereafter, as indicated in FIGS. 9D and 9F, the clevis can be unhooked or otherwise released from the container or box, and the bottom tension line can be disengaged after which and the clevis can be retracted back onto the bed of the chassis. The clevis further can be folded to a lowered, storage or transport position or could be retracted all the way back up against the first end of the chassis frame. For example, in some embodiments, the clevis can be retracted to a recessed area, and can be locked or otherwise secured in place. The container thus can be substantially offloaded and placed to the desired location by a single operator.

For loading a container or box onto the chassis 101, an opposite operation can be utilized wherein the clevis can be connected to the front end of the container or box, and one or more bottom tension lines or winch lines further can be connected to the frame of the container or box, and the winch can be used to draw the container or box onto the bed of the chassis, which can be at an inclined or elevated configuration. Once the container or box is fully loaded onto the bed of the chassis, the first or front end of the chassis can be lowered back to its transport position for removal and transport of the container or box.

In the drawings and specification, several embodiments a lightweight have been disclosed, and although specific terms are employed, the terms are used in a descriptive chassis and container and method of arranging and conveying cargo, and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A system for transport of goods, including hard to handle commodities, the system comprising:
   a drive vehicle;
   a chassis including a frame having a first end and a second end, a hitch connection located at the first end of the frame, and one or more lifting jacks positioned adjacent the first end of the chassis; and
   one or more containers adapted to be received on the frame of the chassis, each comprising a body including:
      a floor having a forward section and a rearward section, the rearward section of the floor terminating at a rear end of the body and overhanging the second end of the frame of the chassis,
         substantially parallel lengthwise side walls, having proximal and distal ends;
      a roof,
      a front wall located adjacent the first end of the chassis and arranged substantially perpendicular to the lengthwise walls, and
      an end door panel disposed substantially parallel to the front wall and hingedly attached to the frame so that when the end door panel is in an upright position a first end of the panel is located adjacent the distal end of each of the lengthwise walls and when the end door panel is in a lowered position end door the panel forms defines a ramp configured for loading the goods into the container, and the floor, side walls, front wall, end door panel, and the roof comprise one or more composite panels including a core layer sandwiched between opposite outer facing layers, and the rearward section of the floor overhanging the second end of the chassis having a selected length and extending downwardly at an angle so as to provide a selected drop distance of the rear end of the body of the container below the second end of the chassis sufficient to substantially reduce an apex of an angle defined between the floor of the container and a ground surface when the end door panel is in its lowered position to provide a ramp for loading and unloading the goods into the container.

2. The system of claim 1, wherein each of the one or more containers comprises a length of approximately 26 feet or less.

3. The system of claim 1, wherein the drive vehicle comprises a pick-up truck.

4. The system of claim 1, wherein the chassis comprises a body having a length of at least approximately 20 feet.

5. The system of claim 1, wherein the lengthwise walls of the container are approximately 8-10 high and have a length of approximately 20-26 feet.

6. The system of claim 1, further comprising stacking cones disposed at top corners of each of the one or more containers, the stacking cones configured to enable the one or more containers to be stacked one on top of another.

7. The system of claim 1, wherein the panels of the floor, side walls, front wall, end door panel and the roof comprise different thicknesses and include different material properties.

8. A system for transport of goods, including hard to handle commodities, the system comprising:
   a drive vehicle;
   a chassis including a frame having a first end and a second end, a hitch connection located at the first end of the frame, and one or more lifting jacks positioned adjacent the first end of the chassis; and
   one or more containers adapted to be received on the frame of the chassis, each comprising a body including:
      a floor having a forward section and a rearward section, the rearward section of the floor terminating at a rear end of the body and overhanging the second end of the frame of the chassis,
         substantially parallel lengthwise side walls, having proximal and distal ends;
      a roof,
      a front wall located adjacent the first end of the chassis and arranged substantially perpendicular to the lengthwise walls, and
      an end door panel disposed substantially parallel to the front wall and hingedly attached to the frame, so that when the end door panel is in an upright position a first end of the panel is located adjacent the distal end of each of the lengthwise walls and when the end door panel is in a lowered position end door the panel forms a ramp configured for loading the goods into the container, and the floor, side walls, front wall, end door panel, and the roof comprise one or more composite panels including a core layer sandwiched between opposite outer facing layers, and the rearward section of the floor overhanging the second end of the chassis having a selected length and extending downwardly at an angle so as to provide a selected drop distance of the rear end of the body of the container below the second end of the chassis sufficient to substantially reduce an apex of an angle defined between the floor of the container and a ground surface when the end door panel is in its lowered position to provide a ramp for loading and unloading the goods into the container, the end door panel comprising at least two stacked cores sandwiched between the outer facing sheets, and having a thickness of approximately 0.90 inch to approximately 1.0 inch and a compressive strength of at least approximately 400 lb./in$^2$.

9. A system for transport of goods, including hard to handle commodities, the system comprising:
   a drive vehicle;
   a chassis including a frame having a first end and a second end, a hitch connection located at the first end of the frame, and one or more lifting jacks positioned adjacent the first end of the chassis; and
   one or more containers adapted to be received on the frame of the chassis, each comprising a body including:

a floor having a forward section and a rearward section, the rearward section of the floor terminating at a rear end of the body and overhanging the second end of the frame of the chassis,
   substantially parallel lengthwise side walls, having proximal and distal ends;
a roof,
a front wall located adjacent the first end of the chassis and arranged substantially perpendicular to the lengthwise walls, and
an end door panel disposed substantially parallel to the front wall and hingedly attached to the frame, so that when the end door panel is in an upright position a first end of the panel is located adjacent the distal end of each of the lengthwise walls and when the end door panel is in a lowered position end door the panel forms a ramp configured for loading the goods into the container, and the floor, side walls, front wall, end door panel, and the roof comprise one or more composite panels including a core layer sandwiched between opposite outer facing layers, and the rearward section of the floor overhanging the second end of the chassis having a selected length and extending downwardly at an angle so as to provide a selected drop distance of the rear end of the body of the container below the second end of the chassis sufficient to substantially reduce an apex of an angle defined between the floor of the container and a ground surface when the end door panel is in its lowered position to provide a ramp for loading and unloading the goods into the container, the one or more containers further comprising one or more side door panels arranged along one or both lengthwise side walls, the side door panels hingedly attached to the body of the container and configured to move from a raised, closed position to a lowered loading position to define additional ramps.

10. A system for transport and delivery of goods utilizing a pickup truck, the system comprising:
   a chassis having a chassis length and including a frame with a first end and a second end, and at least one-wheel assembly supporting the frame; and
   a container configured to be received on the frame of the chassis, the container comprising a body having a container length that is greater than the chassis length, the body including front and rear ends, a floor, side walls, a roof, a front wall, an end door panel hingedly coupled to a rear end of the body, and one or more side door panels hingedly coupled to the side walls of the body the end door panel also configured to move between a raised, closed position and a lowered, open position defining a ramp for loading and unloading of the goods into and out of the container,-and a rearward section of the container positioned to overlap the second end of the chassis by a selected distance and extend downwardly by a drop selected to substantially minimize an apex of an angle defined between the floor at the rear end of the body of the container and a ground surface therebelow.

11. The system of claim 10, wherein the selected distance by which the rearward section of the container overlaps the chassis is approximately 4 feet and the drop is approximately 6 inches.

12. The system of claim 10, wherein the body of the container defines an interior chamber, and further comprising a cargo layout guide applied along the floor of the body of the container and configured to provide plurality of indicators for location of different configuration goods within the interior chamber.

13. The system of claim 10, wherein the container further comprises stacking cones at each corner of the roof, and stacking cones or receptacles along a bottom surface of the body of the container, wherein the stacking cones at each corner of the roof are configured to engage with stacking cones of another container for stacking, and wherein the stacking cones or receptacles along the bottom surface of the body of the container are configured to receive container casters therein to enable movement of the container when the container is removed from the chassis.

14. The system of claim 13, wherein the stacking cones or receptacles along the bottom surface of the body of the container are configured to receive the stacking cones of a second container therein for stacking the container on top of the second container.

15. The system of claim 10, further comprising lifting jacks located at the first end of the frame of the chassis, the lifting jacks configured to lift the first end of the frame of the chassis at least approximately 12 inches.

16. The system of claim 10, wherein the chassis further comprises corner castings at corners of the frame, the corner castings configured to engage a bottom surface of the container to help support and secure the container on the chassis.

17. A system for transport and delivery of goods utilizing a pickup truck, the system comprising:
   a chassis having a chassis length and including a frame with a first end and a second end, and at least one-wheel assembly supporting the frame; and
   a container configured to be received on the frame of the chassis, the container comprising a body having a container length that is greater than the chassis length, the body including front and rear ends, a floor, side walls, a roof, a front wall, an end door panel hingedly coupled to a rear end of the body, and one or more side door panels hingedly coupled to the side walls of the body, the end door panel also configured to move between a raised, closed position and a lowered, open position defining a ramp for loading and unloading of the goods into and out of the container, and a rearward section of the container positioned to overlap the second end of the chassis by a selected distance and extend downwardly by a drop selected to substantially minimize an apex of an angle defined between the floor at the rear end of the body of the container and a ground surface therebelow, the floor, side walls, roof, front wall, end door panel, and one or more side door panels each include one or more composite panels comprising at least one core having a corrugated structure and sandwiched between outer facing sheets.

18. A system for transport and delivery of goods utilizing a pickup truck, the system comprising:
   a chassis having a chassis length and including a frame with a first end and a second end, and at least one-wheel assembly supporting the frame; and
   a container configured to be received on the frame of the chassis, the container comprising a body having a container length that is greater than the chassis length, the body including front and rear ends, a floor, side walls, a roof, a front wall, an end door panel hingedly coupled to a rear end of the body, and one or more side door panels hingedly coupled to the side walls of the body, the end door panel also configured to move between a raised, closed position and a lowered, open position defining a ramp for loading and unloading of the goods into and out of the container, and a rearward section of the container positioned to overlap the second end of the chassis by a selected distance and extend downwardly by a drop selected to substantially minimize an apex of an angle defined between the floor at the rear end of the body of the container and a ground surface therebelow, the first length of the chassis is between about 20-22 feet, and the second length of the container is about 24-26 feet, and wherein the frame of the chassis has a ground clearance of about 20-30 inches.

19. A method for transportation of goods utilizing a consumer vehicle, the method comprising:
positioning a container on a chassis, the container includes a body defining an interior chamber, and comprises a container length that is greater than a chassis length of the chassis, with a rearward section that overhangs the chassis by a selected length and extends at a downward angle so as to define a selected drop at a rear end of the container;
raising a front end at the container so as to increase the downward angle at the rear section of the container;
moving an end door panel to a lowered position with a free end of the end door panel resting on a ground surface to define a ramp;
loading the goods into the interior chamber of the container, the selected drop distance of the reward section along the length is adapted to substantially eliminate an apex of an angle between the ground surface and a floor of the container;
moving the end door to a closed position; and
coupling the chassis and container to the consumer vehicle.

20. The method of claim 19, further comprising providing a loading guide along the floor of the container and arranging the goods at selected locations within the interior chamber in accordance with the loading guide.

21. The method of claim 19, further comprising transporting the chassis with the container received thereon to one or more delivery locations.

22. The method of claim 21, wherein upon arrival of each of the one or more delivery locations, the method further comprises raising the front end of the container, lowering the end door panel, lowering one or more side door panels, or combinations thereof, and unloading at least some of the goods from the container.

23. The method of claim 19, wherein raising the front end of the container comprises actuating lifting jacks, dollies, or a combination thereof, and lifting the front end of the container approximately 12 inches.

24. A method for transportation of goods utilizing a consumer vehicle, the method comprising:
positioning a container on a chassis,
the container includes a body defining an interior chamber, and comprises (a) a container length that is greater than a chassis length of the chassis, (b) a rearward section that overhangs the chassis by a selected length and extends at a downward angle so as to define a selected drop at a rear end of the container, and (c) one or more side door panels along at least one side of the container;
raising a front end at the container so as to increase the downward angle at the rear section of the container;
moving an end door panel to a lowered position with a free end of the end door panel resting on a ground surface to define a ramp;
loading the goods into the interior chamber of the container,
the selected drop distance of the reward section along the length is adapted to substantially eliminate an apex of an angle between the ground surface and a floor of the container;
moving the end door to a closed position;
coupling the chassis and container to the consumer vehicle; and moving the one or more side door panels to a lowered position to provide one or more additional ramps for loading goods into the interior chamber through the sides of the container.

25. A system for transport and delivery of goods utilizing a pickup truck, the system comprising:
a chassis including a frame with a first end and a second end, and at least one-wheel assembly supporting the frame;
a container configured to be received on the frame of the chassis, the container comprising a body having front and rear ends, a floor, side walls, a roof, a front wall, an end door panel hingedly coupled to a rear end of the body, and one or more side door panels hingedly coupled to the side walls of the body; and
a loading/unloading system configured to control movement of the container along the frame of the chassis for loading and/or unloading of the container onto and from the chassis, the loading/unloading system comprising a clevis releasably connectable to the container and a winch coupled to the clevis,-the winch configured to control a rearward movement of the container along the chassis and a tilting motion of the container as the front end of the container approaches and is moved past the second end of the chassis and to a rest position, the end door panel is configured to move between a raised, closed position and a lowered, open position defining a ramp for loading and unloading of the goods into and out of the container, and the rearward section of the floor overhanging the second end of the chassis having a selected length and extending downwardly at an angle so as to provide a selected drop distance of the rear end of the body of the container below the second end of the chassis sufficient to substantially reduce an apex of an angle defined between the floor of the container and a ground surface.

26. The system of claim 25, wherein a rearward section of the container overlaps the second end of the chassis by a selected distance and extends downwardly by a drop selected to substantially minimize an apex of an angle defined between the floor at the rear end of the body of the container and a ground surface therebelow.

27. The system of claim 25, further comprising lifting jacks located at the first end of the frame of the chassis, the lifting jacks configured to lift the first end of the frame of the chassis at least approximately 12 inches.

28. The system of claim 25, further comprising one of more rollers or slides located along the frame of the chassis and configured to facilitate sliding movement of the container along the chassis.

29. The system of claim 25, further comprising a friction resistant coating applied to the frame of the chassis and configured to facilitate sliding movement of the container along the chassis.

30. A system for transport and delivery of goods utilizing a pickup truck, the system comprising:
a chassis including a frame with a first end and a second end, and at least one-wheel assembly supporting the frame;

a container configured to be received on the frame of the chassis, the container comprising a body having front and rear ends, a floor, side walls, a roof, a front wall, an end door panel hingedly coupled to a rear end of the body, and one or more side door panels hingedly coupled to the side walls of the body, the rearward section of the floor overhanging the second end of the chassis having a selected length and extending downwardly at an angle so as to provide a selected drop distance of the rear end of the body of the container below the second end of the chassis sufficient to substantially reduce an apex of an angle defined between the floor of the container and a ground surface; and a loading/unloading system configured to control movement of the container along the frame of the chassis for loading and/or unloading of the container onto and from the chassis, the loading/unloading system comprising a clevis releasably connectable to the container and a winch coupled to the clevis, the winch configured to control a rearward movement of the container along the chassis and a tilting motion of the container as the front end of the container approaches and is moved past the second end of the chassis and to a rest position, the end door panel is configured to move between a raised, closed position and a lowered, open position defining a ramp for loading and unloading of the goods into and out of the container, and the floor, side walls, roof, front wall, end door panel, and one or more side door panels each also including one or more composite panels comprising at least one core having a corrugated structure and sandwiched between outer facing sheets.

\* \* \* \* \*